US010730232B2

(12) United States Patent
Guillemette et al.

(10) Patent No.: US 10,730,232 B2
(45) Date of Patent: Aug. 4, 2020

(54) COEXTRUDED, MULTILAYER AND MULTICOMPONENT 3D PRINTING INPUTS

(71) Applicant: Guill Tool & Engineering Co., Inc., West Warwick, RI (US)

(72) Inventors: Richard Guillemette, West Warwick, RI (US); Robert Peters, West Warwick, RI (US)

(73) Assignee: Guill Tool & Engineering Co, Inc., West Warwick, RI (US)

( * ) Notice: Subject to any disclaimer, the term of this patent is extended or adjusted under 35 U.S.C. 154(b) by 0 days.

(21) Appl. No.: 15/005,383

(22) Filed: Jan. 25, 2016

(65) Prior Publication Data

US 2016/0136887 A1   May 19, 2016
US 2017/0252967 A9   Sep. 7, 2017

Related U.S. Application Data

(63) Continuation of application No. PCT/US2014/066252, filed on Nov. 19, 2014.
(Continued)

(51) Int. Cl.
B29C 64/118 (2017.01)
B29C 69/00 (2006.01)
(Continued)

(52) U.S. Cl.
CPC .......... B29C 64/118 (2017.08); B29C 64/106 (2017.08); B29C 69/001 (2013.01);
(Continued)

(58) Field of Classification Search
CPC ............ B29C 67/0051; B29C 67/0081; B29C 67/0055; B29C 69/001; B29K 2101/12;
(Continued)

(56) References Cited

U.S. PATENT DOCUMENTS 3,558,411 A * 1/1971 Beelien .................... B44C 3/00
                                                   156/167
3,806,769 A * 4/1974 Derrick .................. H01G 9/008
                                                   361/303
(Continued)

FOREIGN PATENT DOCUMENTS

DE   19624412 A1   1/1998
EP   0921217 A1    6/1999
(Continued)

OTHER PUBLICATIONS

Supplementary European Search Report, Application No. EP14863574, dated May 29, 2017, 9 pages.
(Continued)

Primary Examiner — Scott R. Walshon
(74) Attorney, Agent, or Firm — Ziegler IP Law Group LLC.

(57) ABSTRACT

A 3D printer input includes filaments comprising separated layers or sections. These inputs particularly including filaments may be prepared by coextrusion, microlayer coextrusion or multicomponent/fractal coextrusion. These inputs and specifically filaments enable layering or combining different materials simultaneously through one or more nozzles during the so-called 3D printing process. These techniques facilitate smaller layer sizes (milli, micro, and nano) different layer configurations as well as the potential to incorporate materials that would otherwise not be usable in standard 3D printer methods.

6 Claims, 19 Drawing Sheets

Related U.S. Application Data

(60) Provisional application No. 61/971,452, filed on Mar. 27, 2014, provisional application No. 61/906,218, filed on Nov. 19, 2013.

(51) Int. Cl.
  *B29C 64/106* (2017.01)
  *B29K 101/12* (2006.01)
  *B33Y 70/00* (2020.01)
  *B33Y 10/00* (2015.01)

(52) U.S. Cl.
  CPC ............ *B29K 2101/12* (2013.01); *B33Y 10/00* (2014.12); *B33Y 70/00* (2014.12)

(58) Field of Classification Search
  CPC ...... B29K 2105/251; B29K 2995/0062; B33Y 10/00; B33Y 70/00; B33Y 80/00
  See application file for complete search history.

(56) References Cited

U.S. PATENT DOCUMENTS

| | | | | |
|---|---|---|---|---|
| 4,123,483 A * | 10/1978 | Nakahara | ........... | G02B 6/03633 264/1.23 |
| 5,490,962 A * | 2/1996 | Cima | ........... | A61F 2/022 156/272.8 |
| 5,626,703 A * | 5/1997 | Tomita | ........... | B29C 66/431 156/244.11 |
| 6,113,696 A * | 9/2000 | Tseng | ........... | B22F 3/002 118/313 |
| 6,572,602 B2 * | 6/2003 | Furuya | ........... | A61F 13/51496 604/385.03 |
| 7,910,041 B1 | 3/2011 | Priedeman, Jr. | | |
| 2002/0129485 A1 * | 9/2002 | Mok | ........... | G05B 19/4099 29/527.2 |
| 2002/0149148 A1 * | 10/2002 | Chen | ........... | A47J 47/005 269/289 R |
| 2003/0236588 A1 * | 12/2003 | Jang | ........... | B82Y 30/00 700/119 |
| 2011/0096395 A1 * | 4/2011 | Bluem | ........... | D01D 5/34 359/487.04 |
| 2012/0070619 A1 | 3/2012 | Mikulak et al. | | |
| 2016/0297104 A1 | 10/2016 | Guillemette et al. | | |
| 2016/0339633 A1 * | 11/2016 | Stolyarov | ........... | B29C 47/0002 |

FOREIGN PATENT DOCUMENTS

| | | |
|---|---|---|
| EP | 0942301 A1 | 9/1999 |
| WO | 2009111385 | 9/2009 |
| WO | 2013022347 A1 | 2/2013 |

OTHER PUBLICATIONS

European Patent Office, Communication Pursuant to Article 94(3) EPC, Application No. 14863574.1, dated May 9, 2018.

\* cited by examiner

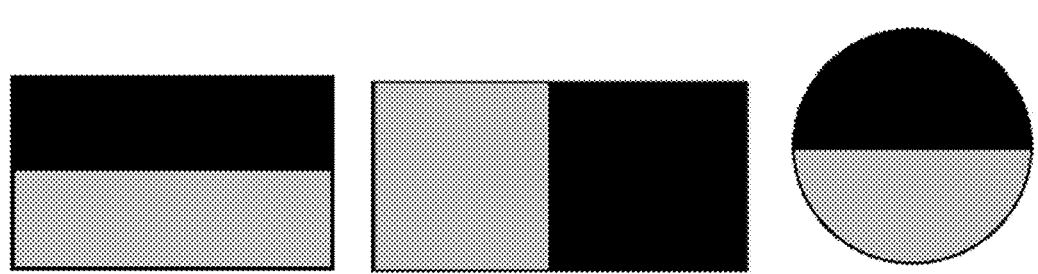
Figure 1(a, b, and c):
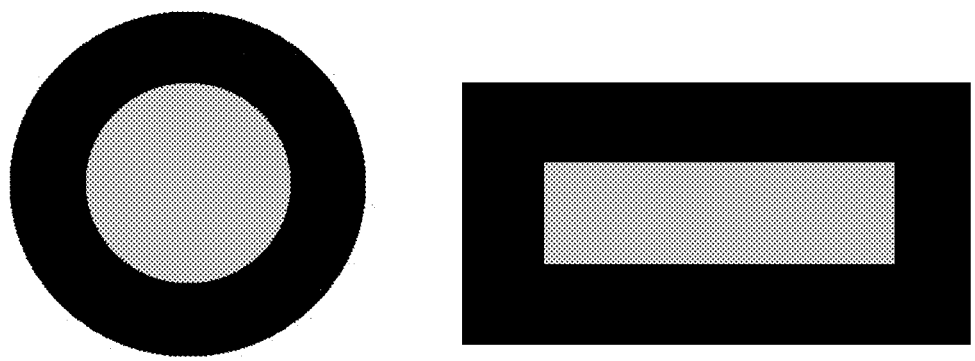
Figure 1(d, e):
Figure 2(a):

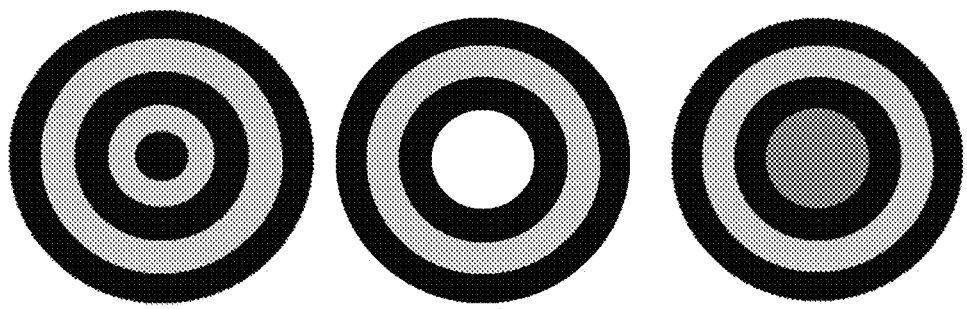
Figure 2(b-d):
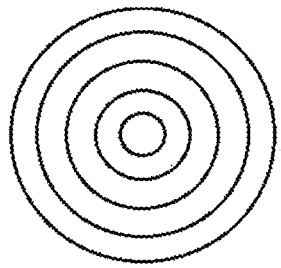
Figure 2(e):
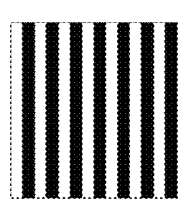 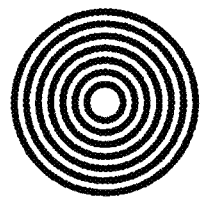 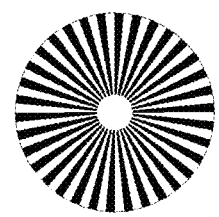
Figure 3(a-c)

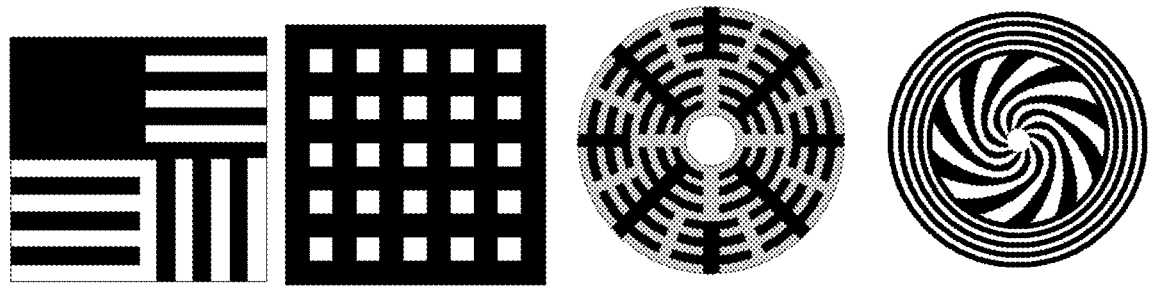
Figure 4(a-d)
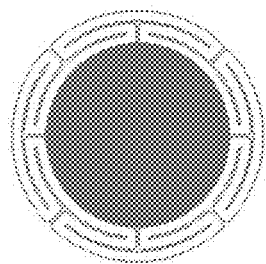
Figure 5:
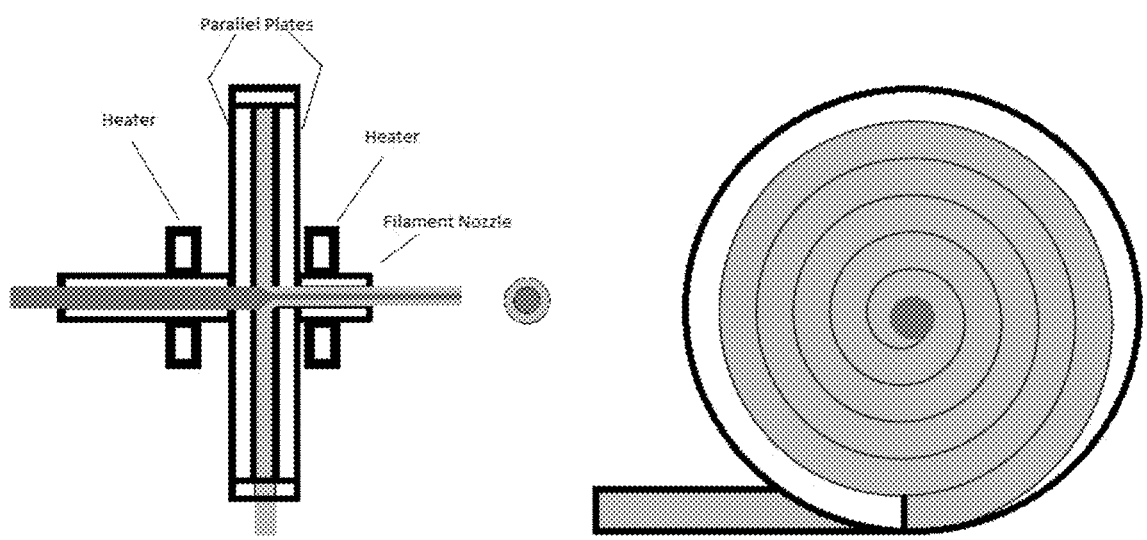
Figure 6(a):  Figure 6(b):

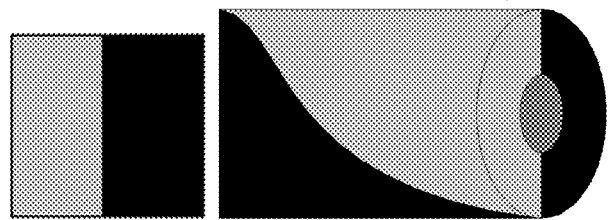
Figure 10(a)
Figure 10(b)
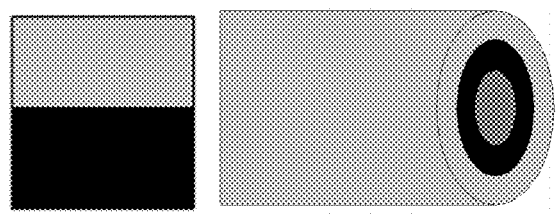
Figure 10(c)
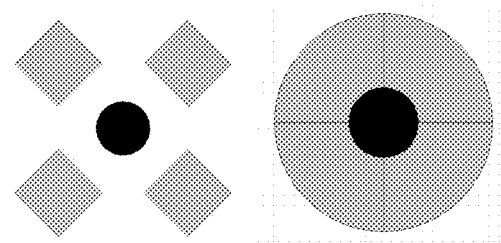
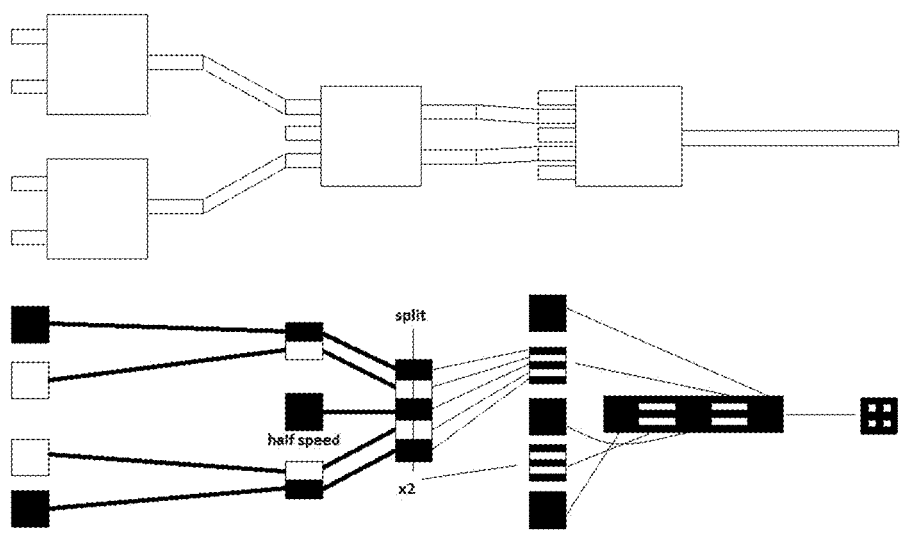
Figure 11(a) and Figure 11(b)

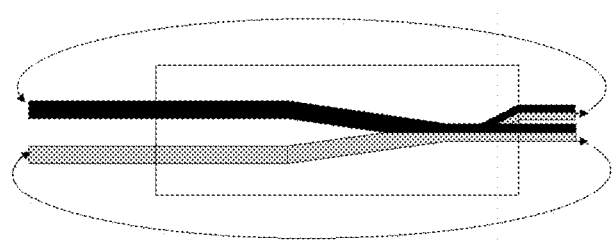
Figure 12
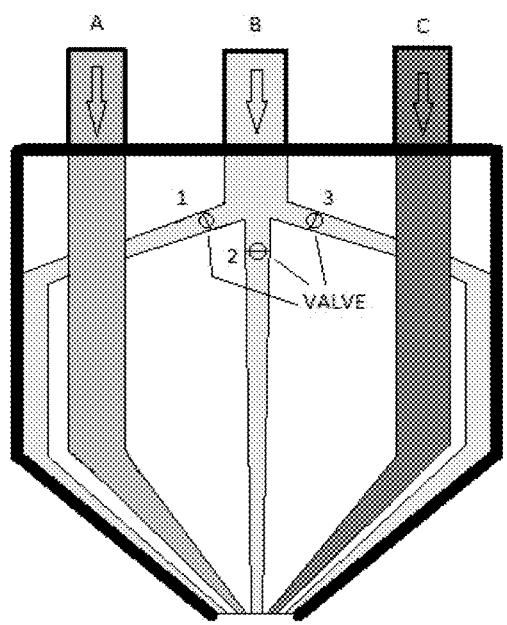
Figure 13
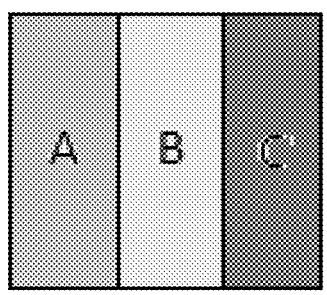 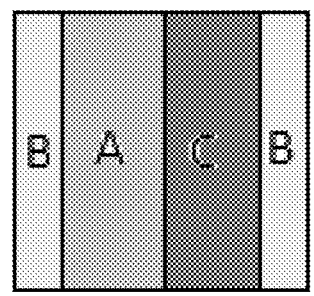 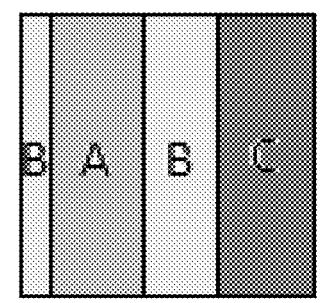
Figure 14(a)　　　　Figure 14(b)　　　　Figure 14(c)

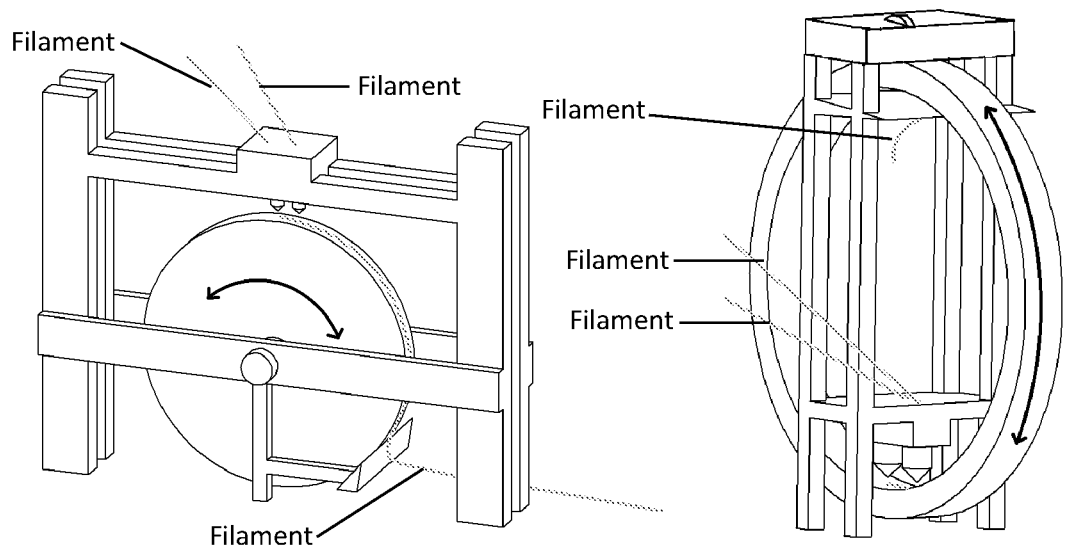
*Figure 29(a) and Figure (29)b*
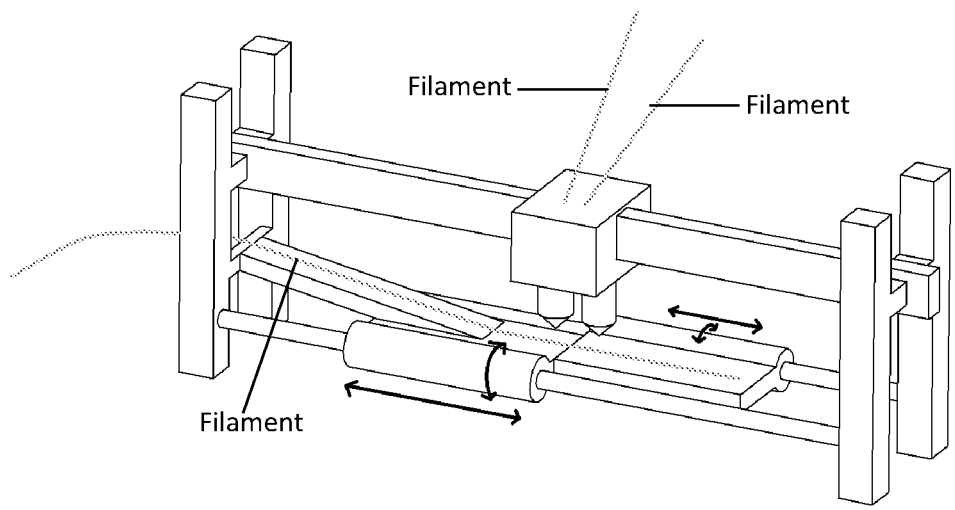
*Figure 30:*

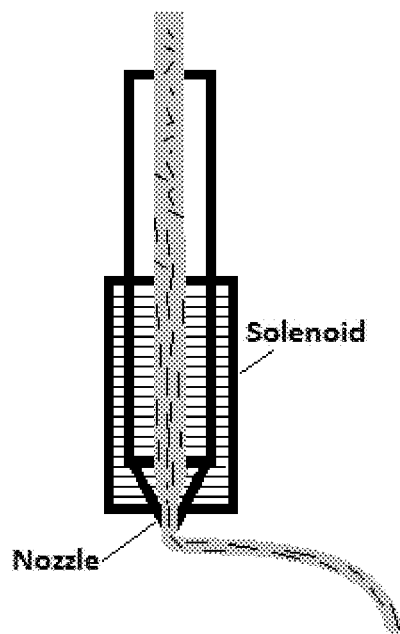
Figure 35:
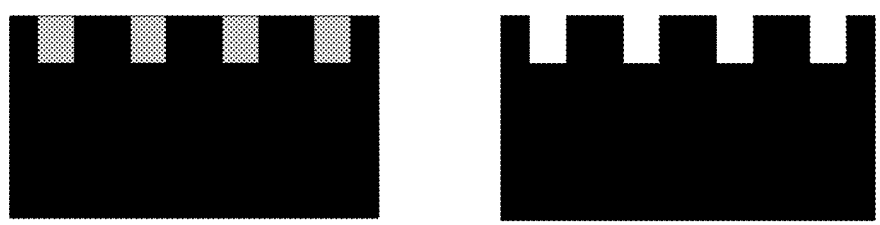
Figure 36 (a and b)

COEXTRUDED, MULTILAYER AND MULTICOMPONENT 3D PRINTING INPUTS

CROSS-REFERENCE TO RELATED APPLICATIONS

This application is a Continuation of PCT/US2014/066252 filed Nov. 19, 2014, and also claims priority from Provisional Application 61/971,452 filed Mar. 27, 2014 and also claims priority from Provisional Application 61/906,218 filed Nov. 19, 2013.

FIELD

The present disclosure generally relates to extrusion die systems. In particular, the present disclosure relates to coextruded, multilayer, multicomponent tubular extrusions that are useful as inputs to three-dimensional fabrication machines. The present disclosure also relates to the design of extrusion heads and nozzles that extrude various laminae, including modifications and applications to the three-dimensional fabrication process.

BACKGROUND OF THE INVENTION

Various approaches to automated or semi-automated three-dimensional object production or Rapid Prototyping & Manufacturing (RP&M) have become available in recent years, characterized in that each proceeds by building up three dimensional objects from three dimensional computer data descriptive of the objects in an additive manner from a plurality of formed and adhered laminae. These laminae are sometimes called object cross-sections, layers of structure, object layers, layers of the object, or simply layers (if the context makes it clear that solidified structure of appropriate shape is being referred to). Each lamina may represent a cross-section of a three-dimensional object, or may be a complete structure itself. Typically lamina are formed and adhered to a stack of previously formed and adhered laminae. In some RP&M technologies, techniques have been proposed which deviate from a strict layer-by-layer build up process wherein only a portion of an initial lamina is formed and prior to the formation of the remaining portion(s) of the initial lamina, at least one subsequent lamina is at least partially formed. Examples of such literature include U.S. Pat. No. 5,130,064 to Smalley and Hull issued Jul. 14, 1992; U.S. Pat. No. 5,855,836 to Leyden and Hull issued Jan. 5, 1999; U.S. Pat. No. 6,366,825 to Smalley et al. issued Apr. 2, 2002; U.S. Pat. No. 8,373,905 to Erol et al., issued Feb. 12, 2013; U.S. Pat. No. 8,226,395 to Smith et. al. issued Jul. 24, 2012 and U.S. Pat. No. 8,512,024 to Pax issued Aug. 20, 2013. Other literature include Berman, B., 2012. 3D Printing: The New Industrial Revolution. Business Horizons, 55(2), pp. 155-162; and Gibson, I., Rosen, D. W., Stucker, B., 2010. Additive Manufacturing: Rapid Prototyping to Direct Digital Manufacturing. London: Springer.

According to one approach, a three-dimensional object is built up by applying successive layers of unsolidified, flowable material to a working surface, and then selectively exposing the layers to synergistic stimulation in desired patterns, causing the layers to selectively harden into object laminae which adhere to previously-formed object laminae. In this approach, material is applied to the working surface both to areas which will not become part of an object lamina, and to areas which will become part of an object lamina. Typical of this approach is Stereolithography (SL), as described in U.S. Pat. No. 4,575,330, to Hull. According to one embodiment of Stereolithography, the synergistic stimulation is radiation from a UV laser, and the material is a photopolymer. Another example of this approach is Selective Laser Sintering (SLS), as described in U.S. Pat. No. 4,863,538, to Deckard, in which the synergistic stimulation is IR radiation from a CO2 laser and the material is a sinterable powder. This first approach may be termed photobased stereolithography. A third example is Three-Dimensional Printing (3DP) and Direct Shell Production Casting (DSPC), as described in U.S. Pat. Nos. 5,340,656 and 5,204,055, to Sachs, et al., in which the synergistic stimulation is a chemical binder (e.g. an adhesive), and the material is a powder consisting of particles which bind together upon selective application of the chemical binder.

According to a second such approach, an object is formed by successively cutting object cross-sections having desired shapes and sizes out of sheets of material to form object lamina. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a CO2 laser. U.S. Pat. No. 5,015,312 to Kinzie also addresses building object with LOM techniques.

According to a third such approach, object laminae are formed by selectively depositing an unsolidified, flowable material onto a working surface in desired patterns in areas which will become part of an object laminae. After or during selective deposition, the selectively deposited material is solidified to form a subsequent object lamina which is adhered to the previously-formed and stacked object laminae. These steps are then repeated to successively build up the object lamina-by-lamina. This object formation technique may be generically called Selective Deposition Modeling (SDM). The main difference between this approach and the first approach is that the material is deposited only in those areas which will become part of an object lamina. Typical of this approach is Fused Deposition Modeling (FDM), as described in U.S. Pat. Nos. 5,121,329 and 5,340,433, to Crump, in which the material is dispensed in a flowable state into an environment which is at a temperature below the flowable temperature of the material, and which then hardens after being allowed to cool. A second example is the technology described in U.S. Pat. No. 5,260,009, to Penn. A third example is Ballistic Particle Manufacturing (BPM), as described in U.S. Pat. Nos. 4,665,492; 5,134,569; and 5,216,616, to Masters, in which particles are directed to specific locations to form object cross-sections. A fourth example is Thermal Stereolithography (TSL) as described in U.S. Pat. No. 5,141,680, to Almquist et. al.

Three dimensional fabrication (herein referred to as 3D printing, without limitation) is essentially a method of building up a model by the deposition of multiple layers of material. The choice of input material used for producing any given model or part thereof thus governs many of the model's properties. Examples of such properties include but are not limited to those of mechanical, optical, thermal, conductive and chemical nature. Additionally, input materials suitable for 3D printing must meet specialized requirements to ensure facile processing. Product/model stability likewise is demanding. Restrictions on the suitability of materials adds to the complexity to identify improved input materials. Thus there is a great need to further improve properties of 3D printing inputs.

SUMMARY OF THE INVENTION

The present invention relates to 3D printer inputs including filaments comprising separated layers or sections. These inputs particularly including filaments may be prepared by coextrusion, microlayer coextrusion or multicomponent/fractal coextrusion. These inputs may be in the form of a rod or may contain a hollow center.

These inputs and specifically filaments enable layering or combining different materials simultaneously through one or more nozzles (preferably 1-6) during the so-called 3D printing process. These techniques facilitate smaller layer sizes (milli, micro, and nano) different layer configurations as well as the potential to incorporate materials that would otherwise not be usable in standard 3D printer methods.

The present invention describes various steps for the preparation of discreet 3D structures encompassed within the input material being used by a 3D printer. Although cross sections of the input for a 3D printer are often rounded it can take other shapes such as rectangular, elliptical, or a variety of other shapes.

The present invention relates to a 3D printer input, wherein said input contains materials, composites and/or mixtures thereof separated into layers or cross sections wherein the layers are in a flat orientation or in a wrapped orientation, or any combination of the two.

The present invention also relates to 3D printer input, wherein the cross-section of the 3D input comprises microlayer coextrusion of 2 to 20 layers.

The present invention also relates to 3D printer input, wherein the cross-section of the 3D input comprises microlayer coextrusion of 5 to 10 layers The present invention also relates to 3D printer input, wherein the cross-section of the 3D input comprises microlayer coextrusion of 20 to 100 layers.

The present invention also relates to 3D printer input, wherein the cross-section of the 3D input comprises microlayer coextrusion of 100 to 1000 layers.

The present invention also relates to 3D printer input, wherein the cross-section of the 3D input comprises microlayer coextrusion of 1000 to tens of thousands of layers.

The present invention also relates to 3D printer input, wherein the cross-section of the 3D input comprises microlayer coextrusion of tens of thousands to hundreds of thousands of layers.

The present invention also relates to 3D printer input, including a filament, wherein the cross-section of the 3D input is made by multicomponent coextrusion.

The present invention also relates to 3D printer extruded input, wherein the input is a filament, wherein said filament contains materials, composites and/or mixtures thereof separated into layers or cross sections.

The present invention relates to 3D printer extruded input, wherein the input is a 0.1-10 mm filament, wherein said filament contains materials, composites and/or mixtures thereof separated into layers or cross sections, preferably wherein the input is a 1-5 mm filament.

The present invention also relates to an extruded 3D printer input, wherein the input is a filament, wherein said filament contains materials, composites and/or mixtures thereof separated into layers or cross sections.

The present invention relates to an extruded 3D printer input, wherein the input is a 0.1-10 mm filament, wherein said filament contains materials, composites and/or mixtures thereof separated into layers or cross sections, preferably wherein the input is a 1-5 mm filament.

The present invention also relates to 3D printer product filament comprising a first filament wrapped around one or more filaments. The present invention also relates to 3D printer product filament, wherein said wrapped filament(s) form(s) a spiral.

The present invention also relates to 3D printer product filament comprising a first filament merged with one or more filaments.

The present invention relates to 3D printer product filament containing a core or substrate.

The present invention relates to 3D printer product filament comprising one or more filaments wrapped and merged around a core or substrate.

The present invention relates to 3D printer product filament comprising one or more filaments merged in a pattern around a core or substrate.

The present invention relates to 3D printer product filament comprising a first filament that is chopped, stacked and welded.

The present invention relates to a method of manufacturing a filament comprising merging two or more filaments side by side.

The present invention relates to a method of manufacturing a 3D printer filament comprising wrapping two or more filaments together.

The present invention relates to a method of manufacturing a 3D printer filament comprising wrapping and melting two or more filaments together.

The present invention relates to a device which forces a filament around a central axis, provides heat to melt the filament as it travels towards the central axis and extrudes the melted filament in a designed cross section. This device could be used to coat or merge with another running along this axis such as another filament, a core or a substrate. This device could be used to extrude products, create a filament or be used as a 3D printer hot end.

The present invention relates to a method of extrusion in which a device forces a filament around a central axis, provides heat to melt the filament as it travels towards the central axis and extrudes the melted filament in a designed cross section. This device could be used to coat or merge with another material running along this axis such as another filament, a core or a substrate. This device could be used to extrude products, create a filament or be used as a 3D printer hot end.

The present invention relates to method of extrusion involving wrapping and melting one or more filaments together to produce an end product.

The present invention relates to method of extrusion involving wrapping and melting one or more filaments together to produce a tubular or rod product.

The present invention relates to method of extrusion involving wrapping and melting one or more filaments together around a substrate.

The present invention relates to a method of manufacturing a 3D printer filament comprising repeatedly chopping and rejoining pieces of one or more first filaments to form a second filament.

The present invention also relates to a filament or stream of materials containing layers of biological components such as cells, fats or proteins. These components could be used in the printing of biostructures or components such as organs or tissues. The present invention also relates to bioprint methods wherein the filament may contain many cell types formed in cell aggregates. In general, the choice of cell type will vary depending on the type of three-dimensional construct to be printed. For example, if the aggregates are to be used to print a blood vessel type three dimensional structure, the cell aggregates will advantageously comprise a cell type or types typically found in vascular tissue (e.g., endothelial cells, smooth muscle cells, etc.). In contrast, the composition of the cell aggregates may vary if a different type of construct is to be printed (e.g., intestine, liver, kidney, etc.). One skilled in the art will thus readily be able to choose an appropriate cell type(s) for the aggregates, based on the type of three-dimensional construct to be printed. Non-limiting examples of suitable cell types include contractile or muscle cells (e.g., striated muscle cells and smooth muscle cells), neural cells, connective tissue (including bone, cartilage, cells differentiating into bone forming cells and chondrocytes, and lymph tissues), parenchymal cells, epithelial cells (including endothelial cells that form linings in cavities and vessels or channels, exocrine secretory epithelial cells, epithelial absorptive cells, keratinizing epithelial cells, and extracellular matrix secretion cells), and undifferentiated cells (such as embryonic cells, stem cells, and other precursor cells), among others. These bio compositions comprise a plurality of cell aggregates, wherein each cell aggregate comprises a plurality of living cells, and wherein the cell aggregates are substantially uniform in size and/or shape. The cell aggregates are characterized by the capacity: 1) to be delivered by computer-aided automatic cell dispenser-based deposition or "printing," and 2) to fuse into, or consolidate to form, self-assembled histological constructs. These aggregates may also be positioned within filaments wherein stabilizing compositions provide a supportive environment for ensuring biological activity during the deposition and curing processes. Such biological aggregates are described in more detail in U.S. Pat. No. 8,241,905 to Forgacs, et al. issued Aug. 14, 2012, and U.S. Pat. No. 8,143,055 issued Mar. 27, 2012.

The present invention also relates to a 3D printer nozzle or hot end which merges two or more deflected output streams side by side.

The present invention relates to a 3D printer nozzle or hot end which wraps two or more deflected output streams together.

The present invention relates to a 3D printer nozzle or hot end which wraps one or more input filaments around another filament, material, substrate or core.

The present invention relates to 3D printer nozzle or hot end which extrudes a 3D printer deflected output flow wherein said output contains materials, composites and/or mixtures thereof separated into layers or cross sections.

The present invention relates to 3D printer nozzle or hot end which extrudes a 3D printer deflected output flow wherein said output contains materials, composites and/or mixtures thereof separated into layers wherein said layers are in a flat orientation.

The present invention relates to 3D printer nozzle or hot end which extrudes a 3D printer deflected output flow wherein said output contains materials, composites and/or mixtures thereof separated into layers wherein said layers are in a wrapped orientation.

The present invention relates to 3D printer nozzle or hot end which extrudes a 3D printer deflected output flow wherein said output axial cross-section of the 3D output comprises microlayer coextrusion of 2 to 20 layers (milli, micro or nano).

The present invention relates to 3D printer nozzle or hot end which extrudes a 3D printer deflected output flow wherein said output is a 0.1-10 mm flow or road, wherein said flow or road contains materials, composites and/or mixtures thereof separated into layers or cross sections.

The present invention relates to 3D printer nozzle or hot end which extrudes a 3D printer deflected output flow wherein said output is a 1-5 mm flow or road, wherein said flow or road contains materials, composites and/or mixtures thereof separated into layers or cross sections.

The present invention relates to 3D printer inputs and nozzle or hot end outputs (which extrude a 3D printer deflected output flow) wherein said inputs or outputs are comprised of so-called plastics including but not limited to polyethylenes (including high density polyethylene (HDPE)), polypropylenes, polystyrenes (including acrylonitrile butadiene styrene (ABS)), polyvinyl chlorides, polytetrafluoroethylenes (PTFE), polysulfones, polyphenylene oxides, polybutylene terephthalates, polyvinylidene chlorides, polyethylene terephthalates, polystyrenes, polycyclohexane diethylene terephthalates, styrene-butadiene-acrylonitrile copolymer, polybutylene naphthalates, nylons such as nylon 11, nylon 12, polyimides, polyamides, polycarbonates, polyurethanes, polyacetals, polyether amides, polylactic acid (PLA), polyvinyl alcohol (PVA), polymethylmethacrylates, epoxys and polyester amides.

The present invention relates to 3D printer inputs and nozzle or hot end outputs (which extrude a 3D printer deflected output flow) wherein said inputs or outputs comprise so-called thermoplastic materials including but not limited to acrylonitrile-butadiene-styrenes (ABS), polylactic acid (PLA), polyvinyl alcohol (PVA), polymethylmethacrylates, polycarbonates, polyphenylsulfones, polysulfones, nylons, polystyrenes, amorphous polyamides, polyetherimides, polyesters, polyphenylene ethers, polyurethanes, polyetheretherketones, fluoropolymers, and combinations thereof.

The present invention relates to 3D printer nozzle or hot end which extrudes a 3D printer deflected output flow wherein said output comprises amorphous polyetherimides.

The present invention also relates to 3D printer nozzle or hot end which extrudes a 3D printer deflected output flow wherein said output comprises concentrations of a thermoplastic material in the build material range from about 50.0% by volume to about 99.9% by volume, with particularly suitable concentrations ranging from about 75.0% by volume to about 95.0% by volume, and with even more particularly suitable concentration ranging from about 85.0% by volume to about 90.0% by volume, based on an entire volume of the build material.

Deposition speed is one unit of measure for distinguishing 3D printing methods. Extrusion rates ranging from about 800 mics to about 2,500 mics are common (Micro-cubic-inches-per-second (mics)). Additional parameters to describe the extruded melt include surface and a central regions, and further include viscosity profiles between the surface and the central region based in part on the axial temperature profile. A viscosity profile exhibiting a higher viscosity of the build material adjacent to the surface compared to the central region may yield superior 3D object performance.

The present invention relates to 3D printer nozzle or hot end which extrudes a 3D printer deflected output flow wherein said output comprise additional elements such as electronic, optical, magnetic, metallic, biologic, structural, durable, thermal, medical, photovoltaic or pharmaceutical.

The present invention relates to method of layer multiplication for a 3D printer output comprising a feedback loop wherein the product molten stream is split in two to create two new filaments.

The present invention relates to 3D printer nozzle or hot end extruder wherein the nozzle rotates.

The present invention relates to a 3D printer extrusion head which contains two or more nozzles or hot ends which can be toggled in order to produce an extrudate of various widths and shapes. The nozzles can be oriented on the head in a variety of different fashions, including but not limited to angular or linear positioning.

The present invention relates to an extrusion head containing valves, stopgaps, buttons, and/or dividers which serve to act as a flow control mechanism so as to control the positioning and/or thickness of a specific filament material in the output extrudate. The extrusion head may have an input filament stream from one or more separate sources, and may have multiple nozzles or hot ends from which the output material may extrude.

The present invention relates to a 3-D nozzle or hot end further comprising an internal valve or stopgap mechanism which could block or temper flow of certain input filaments and/or raw materials, changing the output orientation and/or positioning of the product layers within the output product.

The present invention relates to a nozzle or hot end comprising a magnetic field within and/or around a 3D printing nozzle or hot end.

The present invention relates to a nozzle or hot end which is magnetic.

The present invention relates to a nozzle or hot end which surrounded by a solenoid.

The present invention relates to a magnetic extrusion die.

The present invention relates to an extrusion die which is surrounded by a solenoid.

The present invention relates to a conductive 3D printer filament containing a plurality of layers. Preferably wherein one or more of the layers of the multilayered filament have an iridescent transmittance.

The present invention relates to an iridescent 3D printer filament containing a plurality of layers.

The present invention relates to a multilayered nanocellulose composite 3D printer filament comprising fibers including but not limited to carbon fiber, fiber glass, wood fiber, nanocellulose fibers (particularly acetylated nanocellulose), or carbon nanotubes. Multilayered nanocellulose composite filament comprise fibers composed of polymers selected from the group polylactic acid (PLA), acrylonitrile butadiene styrene (ABS), polycarbonate, polyetherimide and polyphenyl sulfone.

The present invention relates to a method for building a 3-dimensional model in an extrusion-based digital manufacturing system, the method comprising:
feeding a multilayer ribbon filament of a consumable material to a ribbon liquefier retained by the extrusion-based digital manufacturing system, the ribbon filament having a length and a cross-sectional profile of at least a portion of the length that is axially asymmetric;
melting the ribbon filament in the ribbon liquefier to provide a melted consumable material;
extruding the melted consumable material from the ribbon liquefier;
depositing the extruded consumable material in a layer-by-layer manner to form at least a portion of the three-dimensional model.

The present invention relates to a method for building a three-dimensional object with an extrusion-based layered deposition system, the method comprising:
feeding a build material to an extrusion component of the extrusion-based layered deposition system, the build material comprising a carrier material and nanofibers;
melting the carrier material of the build material in the extrusion component to form a melt comprising the carrier material and the nanofibers, the melt having an axial temperature profile;
extruding the melt from the extrusion component at an extrusion rate ranging from about 800 mics to about 2,500 mics, wherein the extruded melt has a surface and a central region, and further comprises:
a viscosity profile between the surface and the central region based in part on the axial temperature profile, the viscosity profile exhibiting a higher viscosity of the build material adjacent to the surface compared to the central region;
and a concentration profile of the nanofibers between the surface and the central region based on the viscosity profile, wherein the nanofiber concentration profile exhibits a higher concentration of the nanofibers adjacent to the surface compared to the central region; and depositing the extruded melt in a layer-by-layer manner to build at least a portion of the three-dimensional object.

The present invention relates to a method of extruding a melt from a 3D extrusion component comprising extruding the melt from an extrusion tip of the extrusion component, the extrusion tip having an inner diameter ranging from about 100 micrometers to about 1,000 micrometers.

The present invention relates to a method of building a 3D model comprising providing the build material to the extrusion-based layered deposition system as a filament. Such filament comprises a thermoplastic material present in the build material at a concentration ranging from about 50.0% by volume to about 99.9% by volume, preferably wherein the thermoplastic material is present in the build material at a concentration ranging from about 75.0% by volume to about 95.0% by volume, more preferably wherein the thermoplastic material is present in the build material at a concentration ranging from about 85.0% by volume to about 90.0% by volume.

The present invention relates to a method of building a 3D printer model, comprising nanofibers, fibers or particles in the build material at a concentration ranging from about 50.0% by volume to about 99.9% by volume, more preferably, wherein the nanofibers, fibers or particles are present in the build material at a concentration ranging from about 5.0% by volume to about 25.0% by volume, more preferably wherein the nanofibers, fiber or particles are present in the build material at a concentration ranging from about 10.0% by volume to about 15.0% by volume.

The present invention relates to a method of building a 3D printer model wherein the carrier material comprises a thermoplastic material selected from the group consisting of acrylonitrile-butadiene-styrenes, polycarbonates, polyphenylsulfones, polysulfones, nylons, polystyrenes, polyamides, polyetherimides, polyesters, polyphenylene ethers, polyurethanes, polyetheretherketones, fluoropolymers, and combinations thereof.

The present invention relates to a method of building a 3D printer model wherein the nanofibers are selected from the group consisting of nanotube fibers, nanowire fibers, and combinations thereof.

The present invention relates to a method of injection molding wherein the extruder is fed via a filament inlet.

The present invention relates to a filament fed injection molding nozzle or hot end specifically designed to lock into a mold via a lip, key, or threaded method. An injection molding nozzle may also be specifically designed to attach to the tip of a 3D printer nozzle or hot end. The mold may contain multiple ports for multiple filament fed nozzles.

The present invention relates to a product filament wherein a fiber or substrate is internally coiled, braided, weaved, folded, or stacked in such a way that when printed, the substrate will release with the length of the printed material.

The present invention relates to a method for storing and dispensing a fiber or substrate within a product filament wherein the fiber or substrate is internally coiled, braided, weaved, folded, or stacked, in such a way that when printed, the substrate will release with the length of the printed material.

The present invention relates to a method of segmented three dimensional fabrication wherein segments of an object are fabricated, subsequently advanced forward relative to the fabrication device; the fabrication resumes in such a way that the next fabrication step adjoins the previous segment with a new fabricated segment. The fabricated object may be a filament and the fabricated filament may be fed directly into another three dimensional fabrication device. These segmented three dimensional fabrication units may be segmented in a tapered, angled, or "staircase" manner. Printing a continuous or long object such as a printer filament wherein a planar conveyer system is used to allow continuous filament segment fabrication may be effectuated by advancing adjoining filament segments relative to the printable area. The conveyor system may also be non planar. The method for printing a continuous or long object such as filament by using a 3D printer design wherein the print bed is a rotating disc or plate around a central axis such that arc segments of a continuous filament can repeatedly be fabricated advanced and subsequently removed from the build plate.

The print bed may also be stationary disc or plate, and the nozzle and/or removal mechanism rotates around a central axis in the middle of the build plate such that arc segments of a continuous filament can repeatedly be fabricated advanced and subsequently removed from the build plate.

The method also envisions printing a continuous or long object such as filament by using a 3D printer design wherein a system of rotating sub-plates atop a main rotating plate move in an orientation so as a printer nozzle can fabricate adjoining linear segments of a continuous object which can repeatedly be fabricated advanced and subsequently removed from the build plate.

Alternatively, the method envisions printing a continuous or long object such as filament by using a 3D printer design in which a nozzle prints atop a rotating drum shaped print bed with the nozzle printing either externally or internally along the drum in order to fabricate adjoining arc segments of a continuous object which can repeatedly be fabricated advanced and subsequently removed from the build plate.

Alternatively, the method envisions a method for printing a continuous or long object such as filament by using a 3D printer design in which wherein the print bed is comprised of two or more build plates which can rotate or otherwise move past each other so as a printer nozzle can fabricate adjoining linear segments of a continuous object which can repeatedly be fabricated advanced and subsequently removed from the build plates.

Alternatively, the method envisions printing an object whose length and/or width exceed the print area by using a 3D printer design in which a multitude of build plates or conveying build plates move relative to each other in order to advance away from a printer nozzle a fabricated segment of the object in any of two or more directions allowing for fabrication of an adjoining segment.

The present invention relates to a nozzle or hot end extruder wherein the nozzle rotates.

The present invention relates to a 3D printer nozzle or hot end wherein the nozzle is composed of various thickness output nozzles which can be reoriented so that extrudate will come out of any of the nozzles. The various output nozzles are removable and interchangeable. Additionally, a filament winding mechanism wherein the nozzle can rotate on two axes so as to produce a filament containing a spiral, "candycane" or other annular design is envisioned.

The present invention relates to the creation of software specifically for the application of creating and building new filaments out of existing filaments and raw materials. This includes software pertaining to the design of new filaments, laying out the orientation of the necessary extrusion heads to achieve new filament design, and software rendering material properties of proposed filament designs.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIG. 1(*a, b,* and *c*) are Examples of coextrusion with flat oriented layers.

FIG. 1(*d, e*) are Examples of coextrusion with oriented layers.

FIG. 2(*a*) is an Example of a three layer flat sheet orientation.

FIG. 2(*b-d*) are Examples of coextruded cross sections: FIG. 2(*b*) is a Five layer geometry, FIG. 2(*c*) is a Hollow three layer tube, and FIG. 3(*d*) is a Rod with three materials.

FIG. 2(*e*) is an Example of a Five layer geometry comprised of the same material.

FIG. 3(*a-c*) are Examples or microlayer coextrusion orientations: FIG. 3(*a*) is a Flat Multilayer FIG. 3(*b*) is a Tubular Multilayer, FIG. 3(*c*) Tubular Multilayer.

FIG. 4(*a-d*) are Examples of multicomponent geometry.

FIG. 5 is an Example of Folding Geometry.

FIG. 6(*a*) is a Side View of an extruding apparatus.

FIG. 6(*b*) is an Internal front view of filament wrapping around a core filament between parallel plates.

FIG. 7(*b*) exemplifies feedblock(s) that could remain stationary and an exposed or enclosed stream would continue towards the deflector(s) and the nozzle which would move together.

FIG. 7(*c*): exemplifies feedblock(s) and deflector(s) that could remain separated from the nozzle and an exposed or enclosed stream would continue towards the nozzle.

FIG. 9(*b*) is an Example of one filament wrapping around another filament.

FIG. 9(*c*) is an Example of filament merger 3D printing head.

FIG. 9(*d*) depicts Side-by-side filament joiner.

FIG. 10(*a*) depicts Spiral or 'Candycane' filament design.

FIG. 10(*b*) depicts Annular Rings filament design.

FIG. 10(*c*) depicts Merged annular filament design.

FIG. 11(a) and FIG. 11(b) depict filament heads that could be modularly designed to be placed in parallel and/or series.

FIG. 12 is an Example of feedback loop filament layering mechanism

FIG. 13: depicts a Valved Coextrusion head

FIG. 14(a-c) refer to various valve possibilities resulting from the apparatus described in FIG. 13. FIG. 14(a) shows the scenario where only the center valve, Valve 2, is open. FIG. 14(b) shows the scenario in which the two side valves, Valve 1 and Valve 3, are equally open and Valve 2 is closed. FIG. 14(c) Represents a scenario in which Valve 1 is open but throttled resulting in a thinner layer in the end product, and Valve 2 is wide open, and Valve 3 is closed.

FIG. 29(a) and FIG. 29)b are Examples of 3D Printers with Angular Shaped Print Beds.

FIG. 30 is an Example of 3D Printer with multiple moving platforms

FIG. 35 is a cross section of a 3D printer nozzle coupled with a solenoid which acts to aid in the alignment of filler particles present in the material being extruded.

FIG. 36 (a and b) depict the method of creating extra small scale features by removal of one material leaving features such as very small scale holes or pathways. Specifically, the gray area in FIG. 36(a) has been dissolved so as to produce FIG. 36(b).

DETAILED DESCRIPTION

Figure 7A:
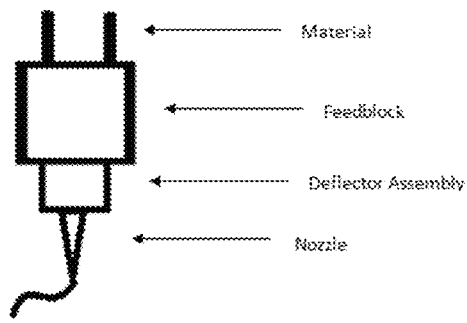
FIG. 7(*a*): The feedblock(s) and/or deflector(s) could be positioned right before the nozzle and therefore move with the nozzle.

The present disclosure is generally directed towards to 3D printer inputs including filaments comprising separated layers or sections. These inputs particularly including filaments may be prepared by coextrusion, microlayer coextrusion or multicomponent/fractal coextrusion. As will be understood, the various diagrams, flow charts and scenarios described herein are only examples, and there are many other scenarios to which the present disclosure will apply.

Coextrusion

Coextrusion is the extrusion of more than one material or layer simultaneously. Materials can be layered together to form an extrudate with each material forming a portion of the cross section. Each layer can be any size or in any position relative to other layers. Some simple two layer products can be seen below in FIG. 1(a-e). These products can have layers in a flat orientation (FIG. 1(a-c)) or wrapped around themselves (FIG. 1(d,e)), or any combination of these orientations.

The input comprises two or more polymer layers. These layers may be reactive in nature (e.g. a photopolymer, thermal polymer, photoinitiator, one or two-part epoxy material, or a combination thereof) or solidifiable or vaporizable when combined with another material (e.g. plaster of paris and water), wherein after dispensing, the material is reacted by appropriate application of prescribed stimulation (e.g. heat, EM radiation [visible, IR, UV, x-rays, etc.], a reactive chemical, the second part of a two part epoxy, the second or multiple part of a combination) such that the input material and/or combination of input materials become solidified.

These inputs and filaments may be multilayered/multicomponent streams comprising so-called plastics including but not limited to polyethylenes, polypropylenes, polystyrenes, polyvinyl chlorides, polytetrafluoroethylenes (PTFE), polysulfones, polyphenylene oxides, polybutylene terephthalates, polyvinylidene chlorides, polyethylene terephthalates, polystyrenes, polycyclohexane diethylene terephthalates, styrene-butadiene-acrylonitrile copolymer, polybutylene naphthalates, nylons such as nylon 11, nylon 12, polyimides, polyamides, polycarbonates, polyurethanes, polyacetals, polyether amides, polymethylmethacrylates, epoxys and polyester amides. Preferred polymers include polylactic acid (PLA), acrylonitrile butadiene styrene (ABS), polycarbonate, polyetherimide and polyphenyl sulfone. ABS grades including but not limited to ABSplus-P430, ABSi and ABS-M30 possess improved properties for many applications.

Examples of suitable thermoplastic materials include but are not limited to acrylonitrile-butadiene-styrenes (ABS), polycarbonates, polyphenylsulfones, polysulfones, nylons, polystyrenes, amorphous polyamides, polyetherimides, polyesters, polyphenylene ethers, polyurethanes, polyetheretherketones (PEEK), fluoropolymers, and combinations thereof. Examples of suitable commercially available thermoplastic materials for use in the build material include amorphous polyetherimides. Suitable concentrations of the thermoplastic material in the build material range from about 50.0% by volume to about 99.9% by volume, with particularly suitable concentrations ranging from about 75.0% by volume to about 95.0% by volume, and with even more particularly suitable concentration ranging from about 85.0% by volume to about 90.0% by volume, based on an entire volume of the build material.

These inputs and filaments may also comprise additional elements such as electronic, optical, magnetic, metallic, biologic, structural, durable, thermal, medical, pharmaceutical or other related fields and applications.

Thermal Stereolithographic (TSL) materials and dispensing techniques are well known in the art and may be used alone or in combination with the above alternatives.

Dispensing techniques include single or multiple hot melt ink jets and continuous or semi-continuous flow, single or multiple orifice extrusion nozzles or heads.

Beyond simple two layer geometries, there can be a multitude of layers (see FIGS. 2a-e). Tens, hundreds or thousands (e.g. ten thousand and one hundred thousand) of layers are achievable. Typical coextrusion approaches can technically be used to form up to around 12 layers. Each layer of which may be comprised of its own material, mixture or composite.

Microlayer Coextrusion

Microlayer coextrusion offers the ability to create geometries similar to those produced by regular coextrusion except with tens to thousands of layers (Such as illustrated in FIGS. 3a-c). Layers of 2-10, 10-100, 100-1000, 1000-10,000 (1,000-2000) are specifically contemplated. Such layer multiplicity is the result of modulating a stream of layers by a multiplication strategy including splitting a stream of materials and stacking the new streams, wrapping a stream, folding a stream or any combinations of these techniques. As with coextrusion the layers can be wrapped or remain flat through a given cross section's geometry. Additional skin layers can be applied onto these geometries either in a wrapped or stacked geometry. Other variations of these applications and geometries will also be apparent.

These geometries may be formed inside an extrusion head and be extruded as a filament or as a direct input into a 3D printer nozzle. The inputs to form these cross sections could come from raw material or individual filaments for each material.

Multicomponent

A multicomponent approach takes multiple streams of layers or materials and rejoins them into a singular stream to create unique geometries. Streams can undergo multiple manipulations before all the streams join into the final geometry. Examples of multicomponent geometries include those illustrated in FIGS. 4(a-d).

Folding

Multilayered products may also be prepared from a typical output product flow channel, wherein the flow channel is morphed to create folds in the flow. These fold patterns are manufactured into the channel so as to gradually modify the contour of the stream. These folds are oriented and propagated in such a way so that the flow can be converged back to a flow passage with a typical cross section but now with a multiplied number of layers. This process may be repeated to multiply the number of layers. One advantage of this method of layer multiplication over others is that the layers remain continuous around the product. FIG. 5 illustrates a core surrounded by a layer which was stretched, bent and morphed into an outside ring. This layer could be comprised of multiple layers.

This folding method can be used to create filaments, coat substrates or could be integrated into a nozzle or could be used to convert filaments into new filaments, or any combination of these processes.

Methods for Creating Various Profiles

Extrusion Heads Versus Filament Heads

In order to get from melted raw material to these profiles exiting the 3D printer nozzle, there are a number of different steps and approaches which may be taken.

One approach would be to start with raw materials, process them into the desired cross section and have them ultimately exit through the 3D nozzle all in a single assembly.

Another approach would be to start with the raw material and extrude the desired cross section as a filament. This filament could then be used as an input for 3D printing.

Another approach would be to start with filaments, process them into the desired cross section and extrude them as another filament.

FIGS. 6 (a and b) depicts another example of how a filament comprised of two concentric layers could be produced. The filament (in the parallel plate) which wraps around the core filament would slowly melt as it reaches the filament being fed through the center of its spiral. Separate heating zones could be used to melt each filament at their proper temperature.

Similarly, another approach would be to start with materials already as filaments and process them into the desired cross-sections and extrude them through a 3D printing nozzle.

Filaments that are produced by any of these means could be processed further by reintroducing them into a process which would accept filaments as their inputs. This process would then produce another filament or end which could be extruded through a 3D printing nozzle. Any potential filament heads which produce filament combinations of any orientation or material are considered as falling within the present invention. Other variations of this method are considered apparent and included in this description.

Raw Material Heads

Extrusion technologies are well known in the art. Examples of such technology include U.S. Pat. Nos. 6,669,458, 6,533,565 and 6,945,764, which are commonly owned by the assignee of the instant application. Micro-layer extrusion processes are specialized extrusion methods that provide products with small grain features such as described in U.S. Pat. No. 7,690,908, (hereinafter the "'908 Patent") and United States Patent Publication 2012/0189789 (hereinafter the "789 Publication") both of which are commonly owned by the assignee of the instant application, the disclosures of which are incorporated herein by reference in their entirety.

Typical micro-layer products are formed in a sheet. Tubular microlayer products may be prepared by first extruding as a sheet followed by conversion into the tube. This creates a weld line or separation between the microlayers. The '908 Patent describes a cyclical extrusion of materials by dividing, overlapping and laminating layers of flowing material, multiplying the flow and further dividing, overlapping and laminating the material flow to generate small grain features and improve properties of the formed product. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with micro/nano-sized features from the rejoining; and forming a tubular shaped micro-layer product from the combined laminate output.

Depending on the cross section being produced, the process could also include folding, feedblocks and/or deflectors.

Deflectors act to wrap or manipulate the multi layered streams. Transforming multilayered or multi-component streams into tubular shapes prior to or during extrusion is implemented by passing the streams over a deflector (such as a spiral, bowtie, circumferential and/or wrapping deflectors). Dies contain but are not limited to the spiral, bowtie, circumferential, wrapping deflectors, and/or any combination of these geometries.

Figure 7B:
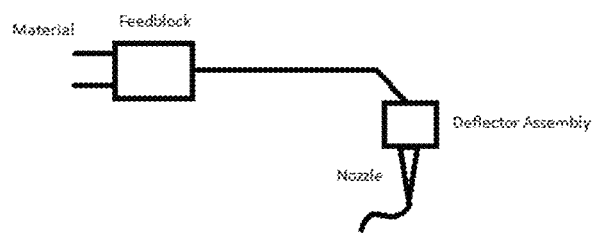
Figure 7C:
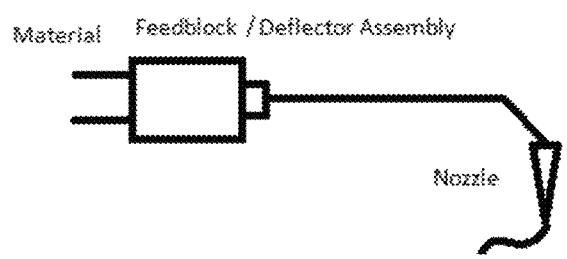

Feedblocks act to create a multilayer stream(s) from the base materials. A combination of feedblocks and or deflectors will result in the desired cross section. From there, the cross section could be extruded into a filament. This filament could then be used in a way typical of many current 3D printers. Another embodiment is to skip the filament stage and process the polymer straight through the 3D printer. This approach could also be done in a number of ways as illustrated in FIGS. 7(a-c). These figures illustrate both deflectors and feedblocks in the processes, however, some designs such as flat layers may not need deflectors and while other designs may not require feedblocks.

Other scenarios are possible including cases in which feedblocks would feed to a deflector, which would then head into another feedblock and yet another deflector. Any number of these scenarios could be imagined, and these are considered apparent and included in the invention. The main point is that some portions of the overall process could be attached or remain detached from the nozzle assembly.

The output of these assemblies could range from nanometers to meters depending on the scale of the 3D printer and its uses.

Figure 8:
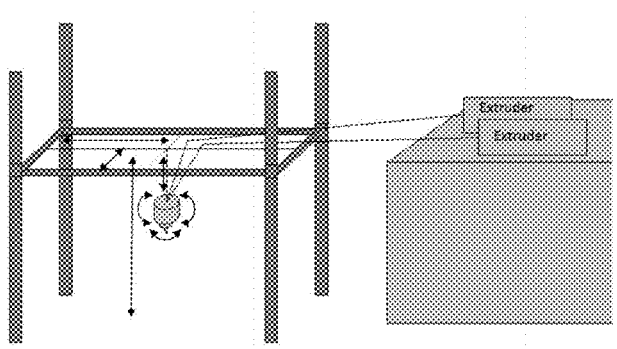
FIG. 8 is an Example of raw material extruder feeding directly into a 3D printing head.

An example 3D printing assembly is depicted in FIG. 8, mounted on a frame. This frame allows movement in all three directions as well as performing rotational degrees of freedom. This includes extruding material on an angle and allowing the head to rotate around the direction of extrusion. Another aspect of this invention is that typical extrusion heads could be used with this design. This design could use a nozzle or a tip and die design. Other designs could include movement of the base plate in any or all of the three directions.

With a multilayered output, the orientation of how different layers are deposited may change based on the direction of the nozzle. To account for this, the nozzle and other components could be made to rotate with the direction of movement. Another orientation would be to have the base rotate the product. Any combination of nozzle rotation and/or linear movement and baseplate rotation and/or linear movement is considered to be within the scope of this invention.

While extruders in the classical sense are production oriented and extrude a large amount of material at a high pressure, there are also smaller scale extruders. Some of these small scale extruders are being used to produce filament on desktops. The raw material heads could be designed to use any scale of these extruders depending on the scale and purpose of the 3D printer. Any scale extruder is considered to be within the scope of this invention.

Filament Heads and Nozzles

Beyond the production of filaments from raw materials is the production of filaments from base filaments. Filaments can be manipulated or combined into other filaments. These filaments can in turn be used by a 3D printer or even be used as a step to more complex filaments. Many of the processes to make these new filaments can be integrated into a 3D printer nozzle itself without the need to coil and use the filament separately.

Two basic functions that could be performed by such filament machines are merging filaments side by side and wrapping a filament in another, see FIG. 9(a) through 9(d). While any shape input could be designed or used, two basic shapes include circular and square inputs. Other shapes, such as any regular or irregular shaped polygonal or annular shape, or any combination therein, could be used. Square inputs and outputs will allow a means of ensuring orientation when necessary while circular is both a commonly used input in 3D printer nozzles as well as a logical shape for creating annular rings. Thus, a square filament output could be, but is not limited to being, used as an input for another filament making process and outputting round filaments when the final cross section is reached. However, a nozzle could be designed to use any shape filaments.

Figure 9A:
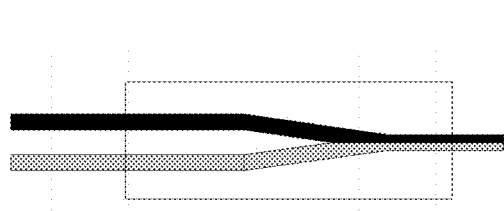
FIG. 9(*a*) Exemplifies filament merger.
Figure 9B:
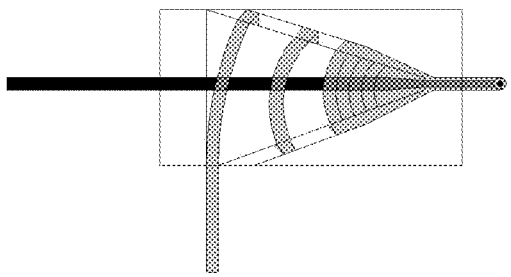
Figure 9C:
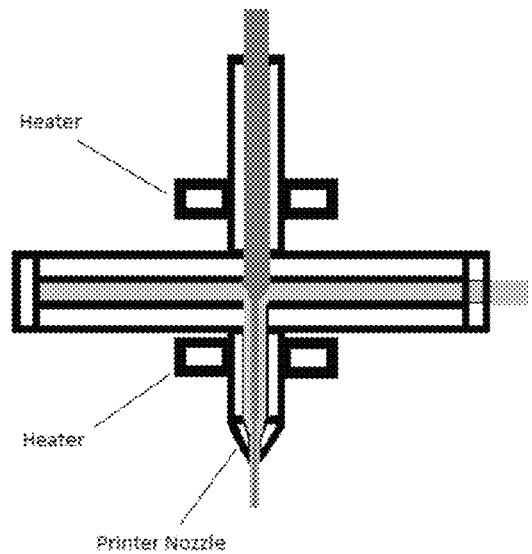

FIG. 9(c) is an example of the same approach integrated as a 3D printer nozzle or 'hot end'. If raw or molten material were to be used as an input to this system instead of filament, a deflector assembly may be necessary to evenly distribute the flow. This would take the place of the parallel plates in the images above. It is understood by those skilled in the art that a nozzle could be designed to accommodate any combination of raw material and/or filament inputs.

Figure 9D:
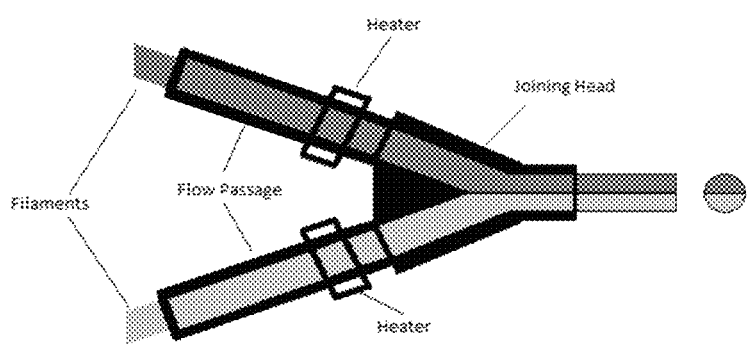

Another design example is depicted in FIG. 9(d), describing a side-by-side filament joiner. Such a design could also be used to accept molten material as inputs. It could also be used as a 3D printer hot end if a 3D printer nozzle were placed at the end.

In filament heads, the amount of time various molten materials are in contact could be made to be tunable to counter any viscous effects while ensuring adequate adhesion.

In designs for wrapping a filament in another filament, a different class of material could be used instead of inner filament. Such material could be continuous or chopped carbon fiber, nanocellulose (particularly acetylated nanocellulose) or other fillers or substrates.

This design has the potential to create spiral or 'candycane', FIG. 10(a) designs. This would occur if the outside filament was already multimaterial or if multiple outer filaments were spiraled within each other.

If the filament had layers in the right orientation, it would produce a filament with annular rings (FIG. 10(b)).

These filament heads function by having a 'filament extruder' or other means force the solid filaments into the head. Rotational motion could also be used to force the filaments into the head. Right before filaments are merged, there is a hot section to melt the filaments and the molten material is merged. The merged cross section then exits and rehardens. As the wrapped solid filament moves radially inwards, the filament could begin to become molten in order to merge with the material running internally within it. This process could also occur without an internal material.

An example use of rotational motion would be if the parallel plates in FIG. 6(a) or the cone in FIG. 9(b) were made to rotate toward the input filament.

Motor speeds could vary during a merging process to create bends, waves or angles as the cross section moves in the direction of extrusion. Turning on and off filament extruders could create a filament which transitions between materials or has different features in the direction of extrusion.

Beyond two filament wrapping or merging designs are ones which utilize multiple filaments. Side-by-side and wrapping mergers can use any number of filaments as inputs and have any number of outputs. For example two filaments could wrap around another filament. These two wrapping filaments could lay side by side or one could wrap on top of the other. Another example would be to have four filaments combine side by side to create a four layer filament. They could also arrange to create a four quadrant square filament (see FIG. 4(a)).

Another design to create an annular or wrapped layer would be to manipulate and merge multiple filaments around a core filament. This could also be accomplished by using square filaments and forming a box around the center filament. The shape could then be transitioned into a round shape if desired (See FIG. 10(c)).

The core itself could also be created by multiple filaments.

Essentially a filament could act as a stream of material described in the coextrusion, multilayer and multicomponent sections. A filament could also be comprised or partially comprised of an extrudable metal. There are endless possibilities for combining filaments and design of cross sections.

These filament heads could be modularly designed to be placed in parallel and/or series, as illustrated in FIGS. 11(a) and 11(b).

FIG. 11(b) is an example of a modular assembly utilizing multiple heads to produce an end filament with four small internal squares. Such a cross section could be produced in multiple ways. A single head merging two filaments could produce such a cross section in multiple steps by controlling input speeds and orientations.

Feedback loops would be possible with filament heads. This feedback loop would layer two or more filaments, then split the molten stream into more desired filaments to create multiple new filaments from the original filament stream. These filaments would then be attached to the ends of the original filament and fed back into the head, as shown in FIG. 12. The result would multiple the number of layers in each filament by the specified number of splits within the head. This process could continue and each full loop the number of layers would be multiplied by the number of splits. Each loop could be done in its own stage but this process could be infinitely continuous, or be stopped after a specified number of iterations.

Another coextrusion head could be designed to provide for multiple pathways for the various inlet filaments so as to increase the number of possible layering combinations of the end product. The merging head could also contain valves or gateways to control each pathway. This could be achieved within a single extrusion head without having to change the input orientation or positioning of the filaments. FIG. 13 is an example of a head designed so that the positioning of the middle inlet filament layer (shown as filament B in the figure) can be altered in the final product by the tightening of the valves. The valves can be used to completely shut off one or more of the prospective pathways, or restrict the flow through one or more of the pathways so as to create a thinner layer of B at the desired location in the end product.

FIG. 14(a) shows the scenario in the above extrusion head where only the center valve, Valve 2, is open. FIG. 14(b) shows the scenario in which the two side valves, Valve 1 and Valve 3, are equally open and Valve 2 is closed. FIG. 14(c) Represents a scenario in which Valve 1 is open but throttled resulting in a thinner layer in the end product, and Valve 2 is wide open, and Valve 3 is closed.

This head could be built to accommodate any number of filaments in any geometry. The head could be designed so that any number of pathways can be made available for a variety of different end orientations. Any combination of inlets with possible end orientations is considered an apparent extension of this idea.

The method of using a filament as the raw material for another extrusion process can be extended to the creation of other objects. One or more wrapping operations could occur around a tip to create a tube or profile shape which could be comprised of multiple materials and could be extruded at nearly any diameter or size. Similarly an extruded filament or rod could be of any diameter. Side by side mergers could be used to create other cross sections, shapes or products. For example, side by side mergers could be used to extrude plastic sheets or films by creating a thin elongated flow passage. Wrapping and side by side mergers could also be made to coat or incorporate substrates of all shapes and sizes.

Side by side filament mergers and filament wrapping devices could be used to create products containing any number of layers or materials. Particularly the merging devices could produce a product comprised of 1-10 materials. The merging devices could produce products with 2-20 layers, 20-100 layers or 100 to thousands of layers.

Chop Stacker

Merging filaments transforms one dimensional basic filaments into nearly any 2D cross section. The next step would be to convert the 2D cross section into 3D structures. This is made possible by repeatedly chopping and welding pieces of filament to create desired shapes within a cross section. The cross sections of pre-chopped filaments could be placed in-line or perpendicular to the new direction of extrusion. Chop stack machines are known and may be adapted according to the methods of the present invention to make these products and could take multiple filaments as inputs. Perpendicular filaments could have different thicknesses in the new direction of extrusion to allow for different thickness blocks to be combined. In line filaments could simply be chopped at different lengths. It would also be possible to have a chopping machine which would merge the created filament with other created filaments, analogous to aforementioned merging devices. These devices could also be integrated into a 3D printer hot end or nozzle.

Figure 15:
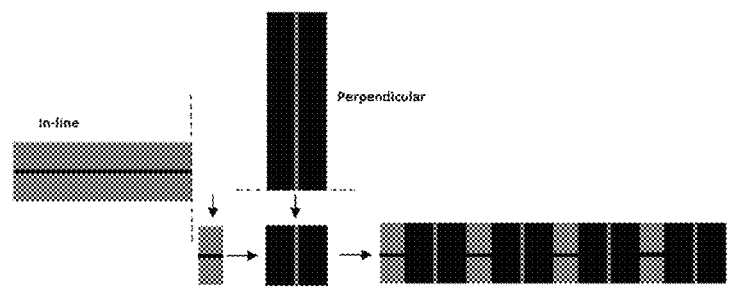
FIG. 15 depicts In-line and perpendicular arrangements example

FIG. 15 demonstrates in line and perpendicular arrangements and their effect on the resultant filament.

Figure 16:
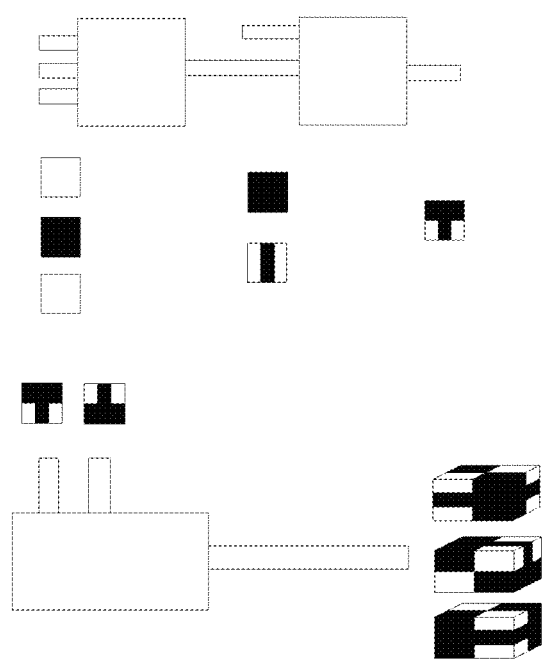
FIG. 16 is an Example of various inlet filament orientations

FIG. 16 illustrates schematically how the same filament introduced in a different orientation into a chopping mechanism will produce a filament changing in the direction of extrusion. Three different views of the repeating section is shown.

Figure 17:
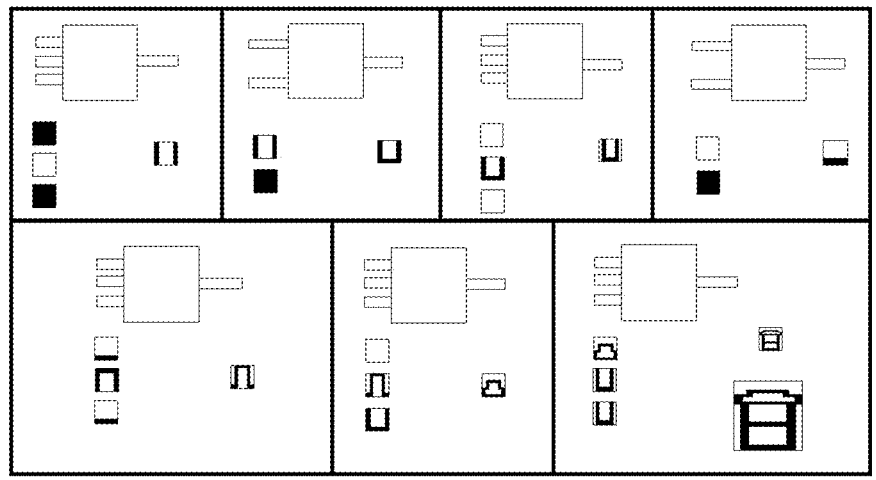
FIG. 17 is an example of a House cross-section.

FIG. 17 illustrates stages to create a cross section with the outline of a house in it. Each stage has the input filaments on the left and the resultant filament on the right. All of the steps are using side-by-side merging.

Figure 18:
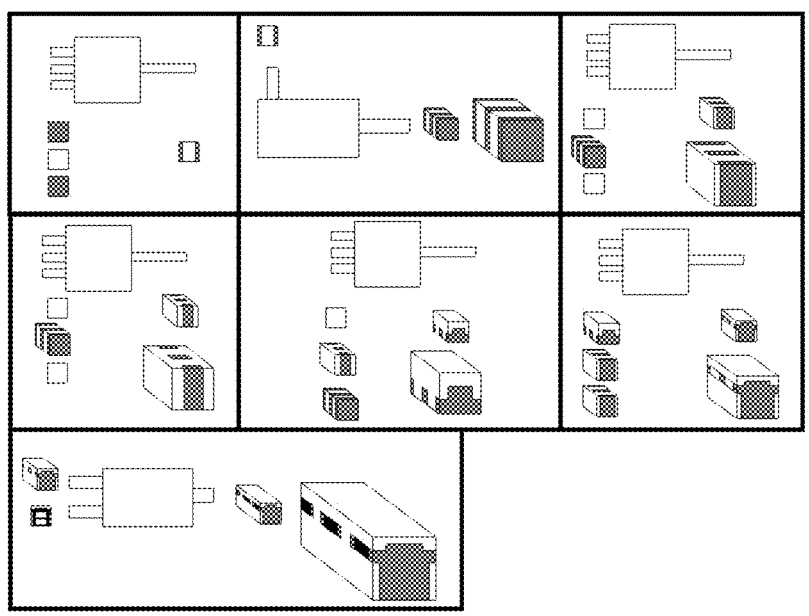
FIG. 18 is an alternate view of a House cross-section product.

FIG. 18 illustrates how to take the filament with a house cross section and add separated walls and transform the house filaments into a filament with discrete houses separated by white space. The top center box shows perpendicular chopping of the filament. The final box shows an in-line chopping of the previous house cross section and the new one. If the white material were to be removed, all that would remain would be a row of houses.

Figure 19:
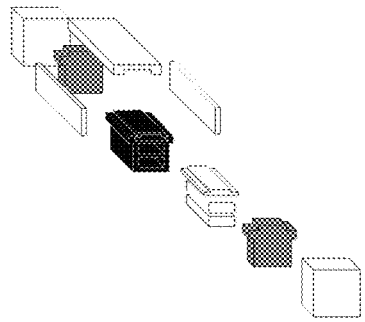
FIG. 19 depicts a Repeating section

FIG. 19 provides an exploded view of the composition of one repeating section.

Such step-by-step processes, with or without a 'chop-stacker' mechanism, like the schematics above could be done one at a time or be integrated as a single machine. This machine could be made to produce filament or be integrated into a 3D printer. Machines could be designed for a specific repeating process for the manufacture of products containing internal milli, micro, or nano features. Different steps of these processes could be performed at different cross-sectional shapes (ex: round, square) or diameters in order to obtain the desired feature shapes and scale.

Distortion of these discreet 3D structures due to parabolic flow or viscous effects of molten material has the potential to be reversed if extruded filament is used in the reverse of the direction it was extruded in a subsequent extrusion step. This step could be as part of a new filament or through a 3D printer nozzle or hot end. One or more skin layers could also be used to minimize distortions.

Filament Fed Injection Molding

Figure 20:
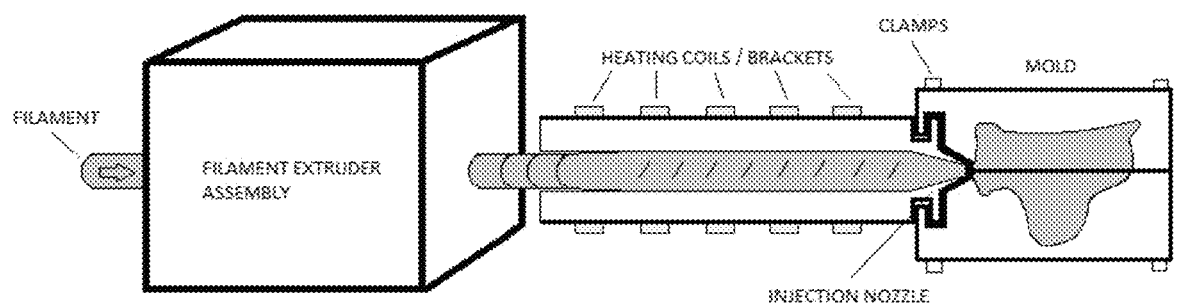
FIG. 20 is an example of a Filament Fed Injection Molding Diagram

Filaments could be used directly in injection molding applications such as depicted in FIG. 20. The filaments would be threaded into a filament extruder assembly, through a heating apparatus to be melted, and then finally through an injection nozzle head directly into a mold.

The extruder assembly could contain a motor or other propellant device such as a screw, piston, or plunger type apparatus to direct and pressurize the filament forward through the process. Any variety of propellant system is considered to be within the scope of the present invention. The filament could also be fed off a spool or another storage device into the extruder assembly.

The filament could also be heated via a heating apparatus before entering the injection nozzle. Various different heating systems could include: heating coils, heating brackets, heating via fluid jacket, radiant heating systems, resistive heating systems, or a variety of other heating methods.

A variety of injection nozzles could be designed for this application. A specific nozzle could be an injection molding nozzle that attaches directly onto the tip of a 3D printer nozzle. This nozzle could be easily installed and removed from the 3D printer head, essentially converting an existing filament 3D printer into a filament injection molding device. This nozzle could be designed to mate with a mold in a variety of different ways. The injection nozzle could lock into the mold in a key-like manner, could be threaded into the mold, the mold could be designed to fit around a lip or edge of the nozzle (as shown in FIG. 20), or the nozzle could simply be machined to a very high tolerance fit within the mold. The mold could be clamped or bolted around the nozzle from side to side as shown in FIG. 20, or from back to front via a clamping or bolt mechanism of some kind. All varieties of injection molding nozzles and clamping systems are considered to be within the scope of the present invention.

Multiple filament fed injection mold mechanisms could be used on a mold which would have multiple injection ports. This would allow for the mold to fill quicker and for otherwise difficult to fill features to be filled by additional injection ports in close proximity.

Continuous Substrate Reinforced Filament

Another aspect of this invention relates to a substrate reinforced 3D filament where the substrate(s) is coiled braided, weaved, folded, stacked, etc. in such a way that when printed, the substrate will release with the length of the printed material. Substrates could include but are not limited to carbon fibers, optical fibers, Kevlar fibers and wires. Multiple substrates could be incorporated in the filament. It is necessary to stack weave or coil the fibers if the printed path is longer than the length of filament extruded to print that path.

Figure 21:
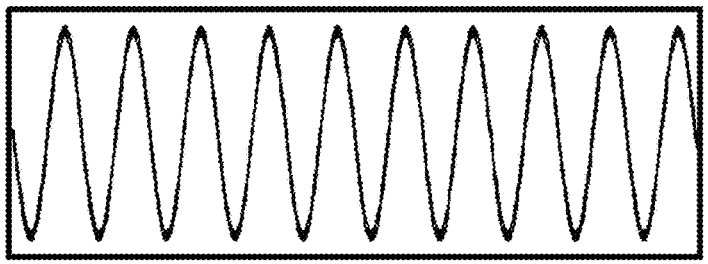
FIG. 21 depicts a Filament with coiled fiber.

FIG. 21 depicts a segment of a filament with a coiled fiber along its length.

Figure 22:
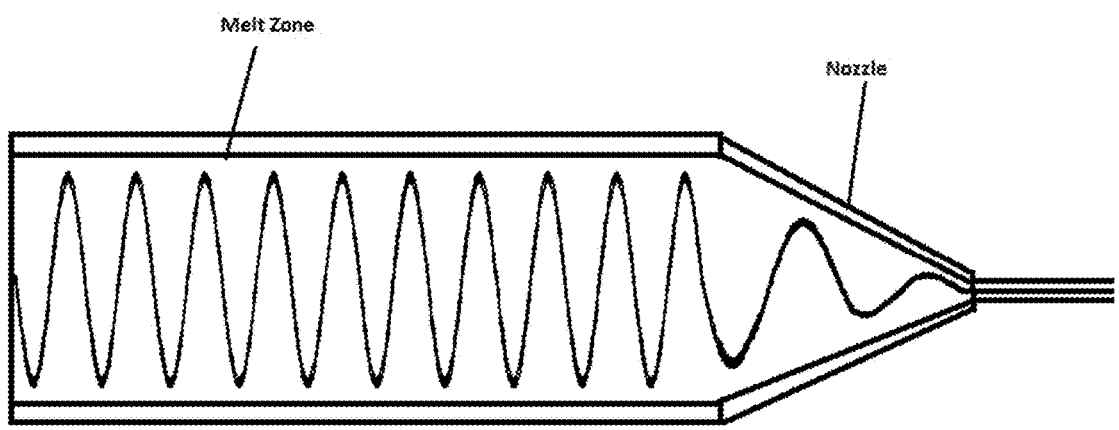
FIG. 22 is a Diagram of fiber filament unwinding

FIG. 22 depicts how the fiber in a fiber filament would unwind as it is extruded from a nozzle.

These substrate reinforced filaments could be created by wrapping, weaving, folding or braiding the substrate(s) around an initial filament or substrate and subsequently coated. Alternatively the substrate could be introduced coiled, woven, braided or folded in such a way that it will only need to be coated.

Figure 23:
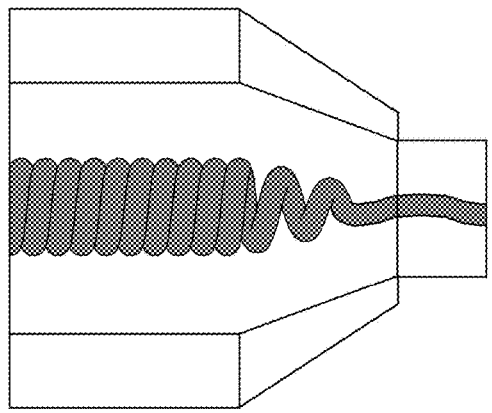
FIG. 23 depicts a Coiled filament unwrapping through a nozzle

FIG. 23 is an example filament being extruded through a nozzle with a substrate which is coiled without an internal core.

Figure 24:
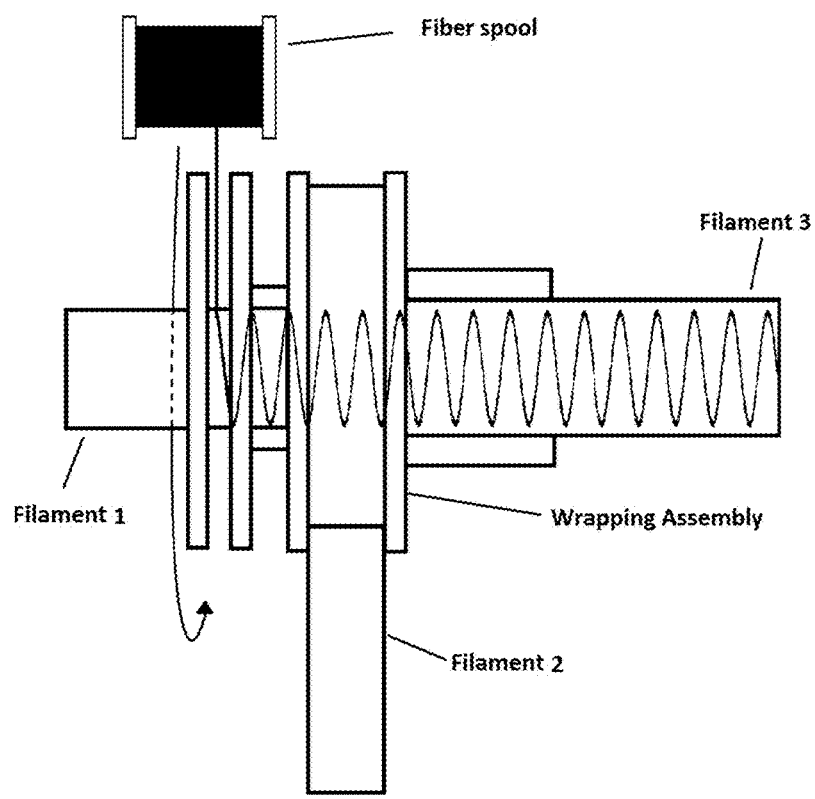
FIG. 24 depicts a Method for creating a substrate filament

FIG. 24 is a schematic of a process to create a substrate filament using a 'filament head' approach by wrapping a fiber or substrate around an initial filament, Filament 1, and subsequently coating Filament 1 and substrate with another filament, Filament 2, to create Filament 3.

In FIG. 24, filaments 1, 2 and 3 could be of any material or diameter. Filament 3 could be of a smaller diameter than Filament 1, with the result being that the coiled substrate would be brought down to a smaller diameter and the coil increasing in pitch. The schematic shown in this figure could be incorporated into a 3D printer nozzle or hot end with Filament 3 being the output of the printer hot end.

These filaments could also be made on a typical extrusion line in which a braider or spiral machine processes the substrate around an initial filament or substrate which is subsequently coated with any additional layers. Additionally components of any braid, weave, coil or fold could also be made of polymer which could become molten in subsequent steps to facilitate release of the other substrates.

3D Printed Filaments

Filaments with imbedded 3D features may also be produced by direct 3D printing those filaments. In order to accomplish this, individual segments of the filament could be printed at a time. After a segment is printed, an advancing stage in which the filament segment is advanced forward relative to the 3D printer nozzle or the 3D printer nozzle would promote the segment away from the nozzle. Next, another segment could be printed in such a way that it overlaps or is printed end to end with the previous segment to continue the growth of the filament. Due to potential interference with the printer nozzle and the end of a segment, the end of a segment could be printed in a tapered, angled or 'staircase' manner with the end section remaining in the printable zone after advancement so that it can be printed upon. The printed filament could be of any cross section and size. Of particular importance are filaments with diameters or side lengths of 0.1-10 mm.

Figure 25:
FIG. 25 depicts a 3D Printed Filament Diagram

FIG. 25 depicts three segments of a 3D printed filament. There is a gap between the segments for illustrative purposes but in practice this gap would be non-existent and the 'staircase' shapes would be overlapping. The staircase steps represent a shift for each layer or groups of layers that make up the printed filament.

The necessary stages for printing of a long or continuous part could include some or all of the following stages including the printing or fabrication of a segment, the advancement of that segment relative to the printer nozzles, the removal or separation of completed segments from the printer bed or build plate and resumption of printing. This method of producing a continuous filament with a 3D printer could be applied to printing other objects with a single large characteristic dimension.

There are a number of methods which could accomplish the tasks of printing a segment, advancing it forward and continuing the print. Many of these methods relate to the movement of build platforms or print beds. Variations of heating, cooling, surface texture or treatments incorporated in these platforms would be obvious to someone of ordinary skill in the art.

One method of continuously printing in a direction would involve a conveyor or scrolling surface over a print or build platform as part of a 3D printer. A conveying sheet passing over a rigid print platform would be able to advance the segments of printed material forward out of the printing zone such that the 3D printer could resume printing the next segment. Completed portions of the filament could be peeled from the sheet conveying over the printbed by the bending motion around the end of the conveyor, a scraper or by other means. There are a number of ways to create the conveying motion. For example the conveyor could be powered by a internal motor or the filament could be pulled by an external motor or robot arm. Beyond a planar printbed, the printbed could be shaped in such a way to contour around the cross section of the printed filament to help maintain its form. An example would be a semi-circular or arc shaped trough or path in which the filament would be printed. A sheet which would provide a sufficient surface for the printed material to adhere to would convey or scroll along the trough or planar platform. Rather than using a conveying sheet, linked rigid segments of the trough or platform could be used as a substitute. The conveying motion of the printbed could be used to control a dimension of the three dimensional printing that is occurring or it could simply act to convey the printed material forward.

Figure 26:
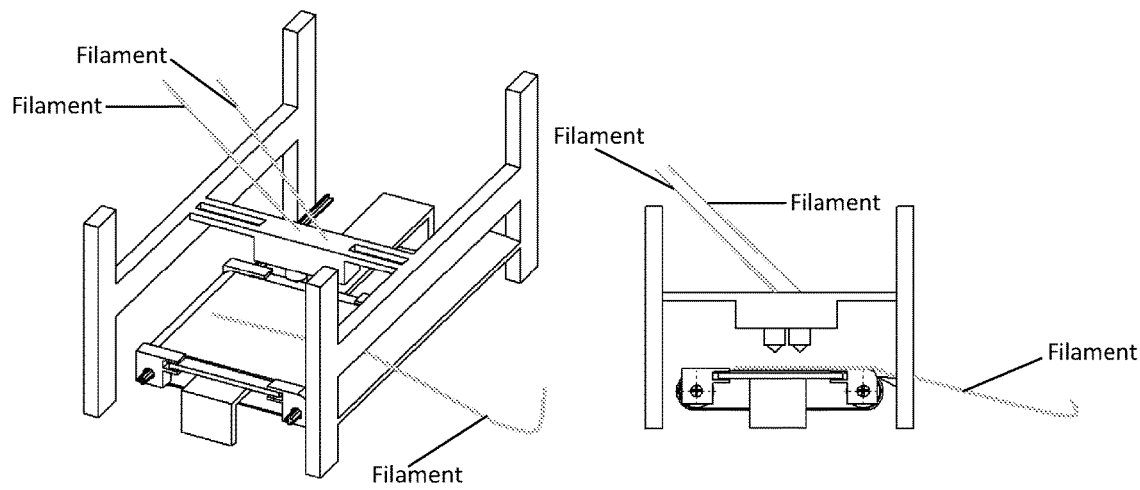
FIG. 26 depicts a Planar conveying platform 3D printer

FIG. 26 above represents an example 3D printer with a planar conveying platform. FIG. 26 shows two angles with a gray filament being printed by two nozzles both of which are fed by gray filaments. The completed portion of the filament is shown hanging from the side of the printer.

Another method of advancing the printed filament segments forward would include a rotary 3D printer. In such a design the hot ends and scraper could rotate relative to the printer bed or the printer bed could rotate relative to the scraper and nozzle. These printers could be made to print with x-y-z coordinates or with polar coordinates. The rotary motion of the printer bed or nozzle could be used to account for a degree of freedom. With this method, it would be possible to print filament segments in the shape of an arc at a limited number of degrees of rotation before advancing to a next arc segment while peeling up the previously printed segment with a scraper, take up or other removal mechanism. It would also be possible with the rotational motion of the printer to incorporate a spool in order to wind up the filament while it is printed.

Figure 27A:
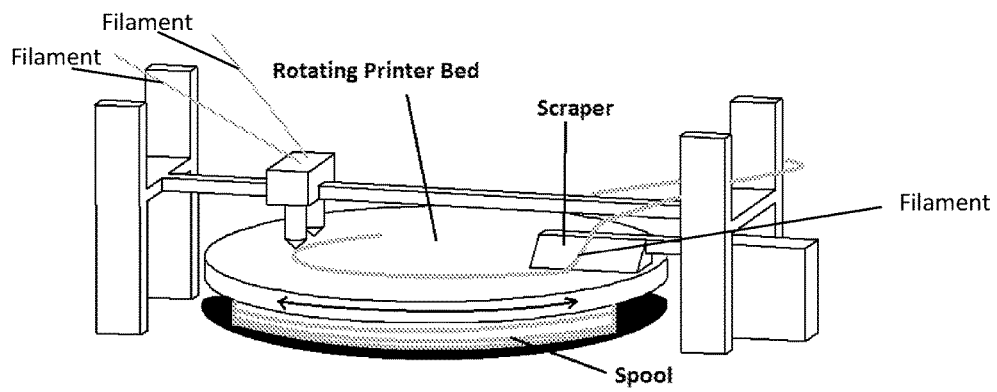
FIG. 27(a) is an Example of Rotary 3D Printer
Figure 27B:
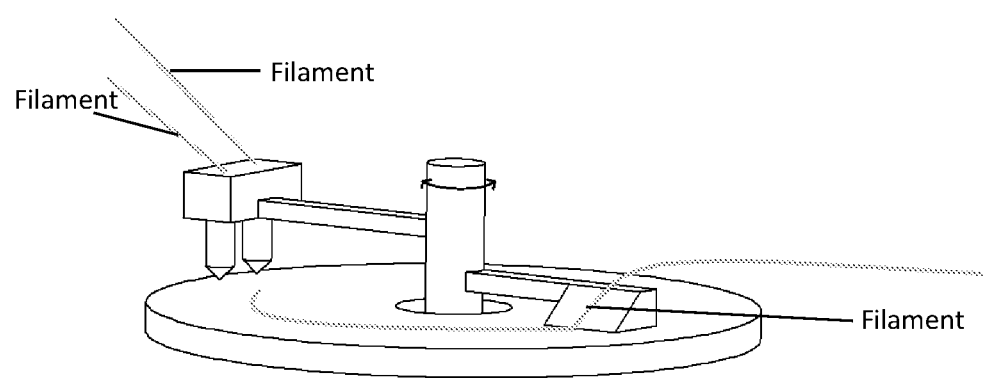
FIG. 27(b) is an alternate example of rotary 3D printer

FIG. 27(a) is an example of a rotary printer where the build plate or print bed rotates relative to the printer nozzle and a scraper. Beneath the build plate is a spool which would utilize the rotation of the build plate and would act to wrap up the printed filament. With the spool being used, it may be necessary to change the diameter at which the filament is printed as the spool is filled. FIG. 27(b) is an example of a rotary printer in which the nozzle and scraper would rotate relative to the build plate.

Figure 28:
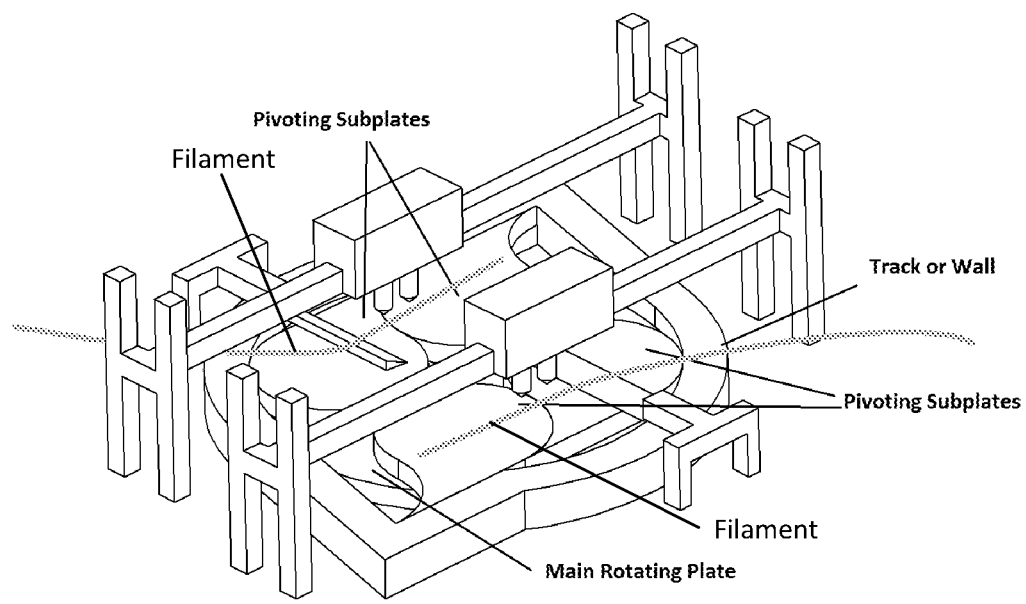
FIG. 28 depicts a Pivoting Sub-Plate 3D Printer

A rotating print bed could produce linear segments which would line up end to end if there were pivoting sub plates which could be printed across. FIG. 28 shows an example of such a printer which would simultaneously print two filaments. The main rotating plate would rotate 90 degrees upon completion of each segment, the sub plates or platforms could rotate in a manner that would allow a continuous linear filament to be printed. During an advancement stage, the rotation of the subplates paired with the rotation of the main rotating plate would be such that a printed segment's final location compared to its initial location would be a linear translation along its main axis. The rotation of the sub plates could be driven by motors, a track or a wall around the subplates. Another variation could include mainly rectangular subplates which are pinned to the main rotating plate close to the main rotating plates center of rotation. There could be any number of subplates. Other variations will be apparent to those skilled in the art.

Other variations of rotary printers which could be used to advance a filament forward would involve 3D printing upon or inside a vertically aligned ring or drum shaped printer bed which would be made to rotate. Other variations of rotary 3D printers will be apparent to those skilled in the art.

FIG. 29(a) demonstrates a 3d printer which would use a drum shaped rotary print bed to perform filament advancement. FIG. 29(b) demonstrates a 3D printer using a vertically aligned ring shaped rotary print bed to perform filament advancement.

Advancement of filament segments could also be performed by 3D printers comprised of a multitude of build plates, print beds or platforms. These printers would have the capability to move platforms relative to each other. A segment could be printed across the boundary of two or more platforms lying next to each other. The platforms and a removal tool could move relative to each other in order to peel off the segment from a leading platform. The separate platforms would then move relative to each other in such a way that the leading platform would become a trailing platform. The next segment of the object would then be printed across the platforms. This would allow for continuous printing of the object. The platforms themselves could move relative to each other to perform various functions of separation or complete removal. Such movement could enforce bending or shear forces which could promote a printed structure to separate from the platforms.

FIG. 30 shows an example 3D printer with multiple platforms which could print a continuously long filament or object. A segment could be printed across the two platforms which can translate relative to a scraper. After the scraper removes the portion of the printed segment on the leading platform, the leading platform can flip downwards to avoid collision during movement. The trailing platform could advance forward or the leading platform could move backwards. After the previously leading platform is behind the other platform, it could flip back into position. This platform would now be the trailing platform. The next segment could then be fabricated and process repeated. These platforms could also translate in tandem to control one or more degrees of freedom during printing. Other approaches to platform movement includes an approach in which the platforms raise or lower in order to move past one another or an approach where the trailing platform rotates 180 degrees around its normal axis such that the end of the segment is now next to the other platform. Other variations will be apparent to those skilled in the art.

The schematic 3D printers in FIG. 26 through FIG. 30 are for illustrative purposes and therefore complete 3-dimensional control is implied. Variations on the mechanisms for achieving the various dimensional controls should be considered obvious to some one of ordinary skill in the art. The various printers which can advance a filament for continuous production can also all have a trough or channel shaped bed which is tuned or tunable for the intended filament or object being produced.

It is possible that a system of build platforms could allow a printer to print continuous objects in two directions. This would allow objects of nearly unlimited length and width to be printed. Thus far ways to advance an object continuously in a single direction have been mentioned however similar approaches could be taken to advance objects in multiple directions with continuous fabrication. Some approaches to perform the continuous printing in two directions could involve a conveyor of conveyors or multiple conveyors or platforms that rotate or translate relative to each other. For example if a single conveyor could convey a printed object in the y direction, a conveyor comprised of a multiple of these conveyors linked together could translate the object in the x direction. The conveyor comprised of conveyors would be analagous to a conveyor comprised of linked rigid platforms that as a whole could convey an object in the x direction, however each of those platforms would be a conveyor themselves which would be capable of conveying in the y direction. Alternatively multiple conveyor platforms which could translate relative to each other and rotate themselves around their z axis, could pass along printed segments and align such that printing could continue across platform boundaries. Non conveyor platforms along with removal tools or removal methods could be used to pass along printed segments and align such that printing could continue across platform boundaries. The removal tools and methods could include but are not limited to scrapers, robot arms or the platforms own relative motion. Tables or other forms of support could be placed around the build area to provide support for completed segments of the print. Printing across platforms could be accomplished is a similar manner as before with a tapered or staircase approach.

Figures 31A, 31B:
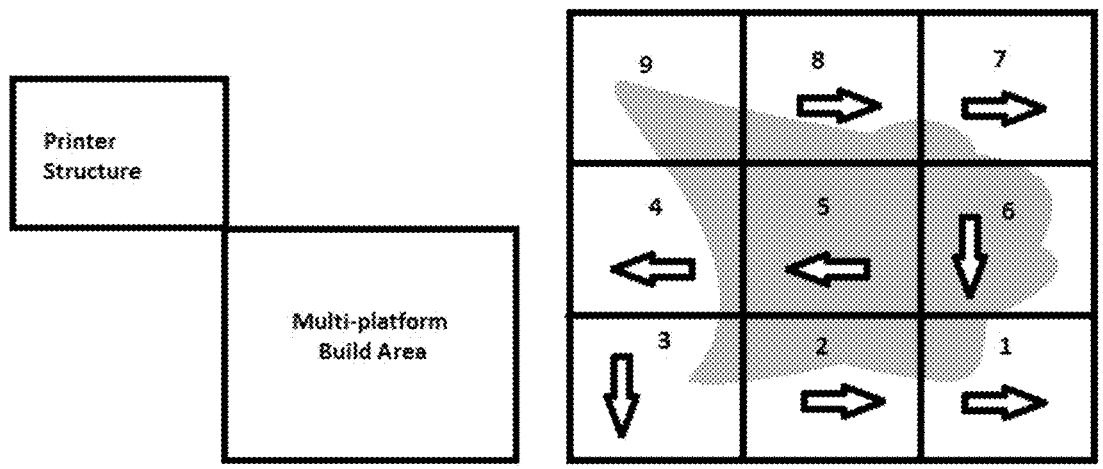
FIG. 31(a) and FIG. 31(b) are Examples of 2D Conveyor 3D Printer

FIG. 31(a) shows an example how a in a printer capable of advancing a multi segment print in two directions could be laid out with the structure supporting a nozzle out to one corner relative to the platforms. FIG. 31(b) shows how a large object could be printed. The arrows indicate which direction the object would be advanced in order to continue the print and the number indicates the order of the printed segment.

These methods of continually 3D printing a filament could be coupled with another 3D printer in such a way that the filament is directly used after fabrication. The filament 3D printer could be used as an attachment or as an accessory to another printer.

Rotating Nozzle

Figure 32:
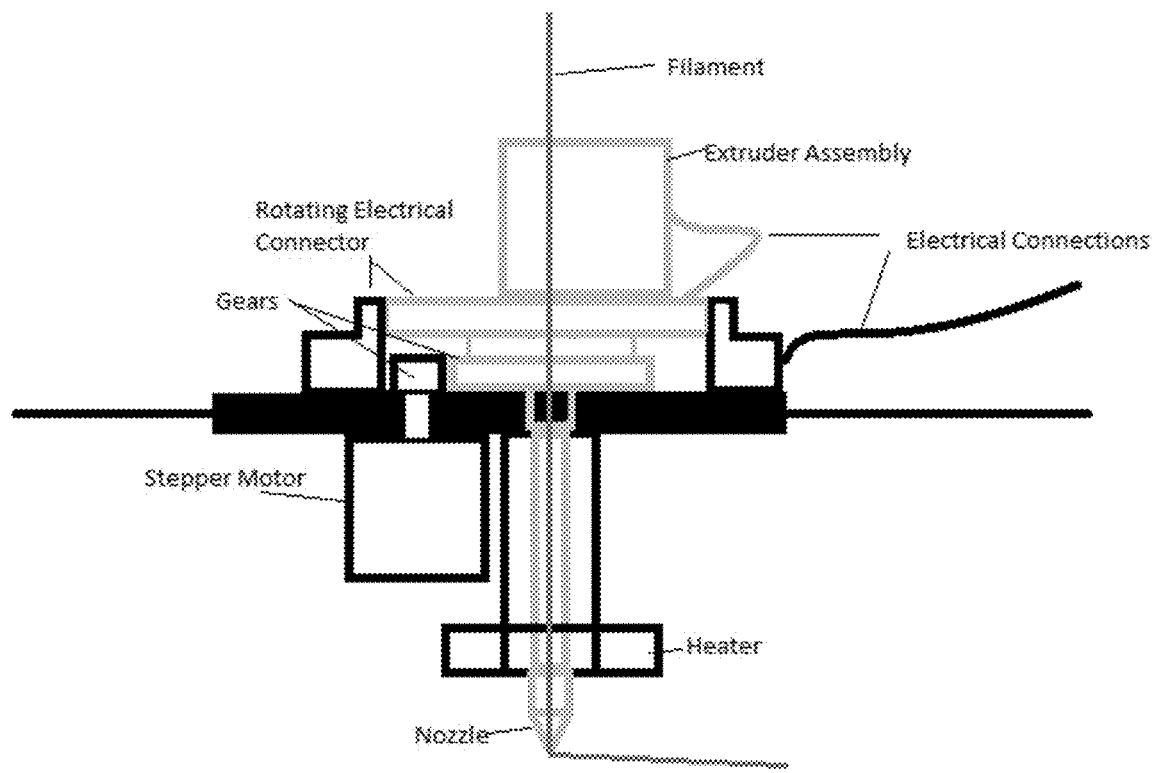
FIG. 32 is an example assembly for a rotating nozzle. The black components are stationary and the grey components rotate along with the filament.

The orientation of layers and features laid down by a 3D printing nozzle may be of importance in the product being printed. Without compensating for the change in direction of a printer nozzle, this orientation will change. In this case, a rotating nozzle, base or printer, such as depicted in FIG. 32, could be used to determine the orientation of layers or features laid down by a 3D printer. Components such as the extruder, spool of filament and heaters may need to rotate with the nozzle depending on the mechanical design as well as the software design. Electrical connections could be maintained with rotating electrical connectors such as a slip ring.

Interchangeable Nozzles

Figures 33A, 33B:
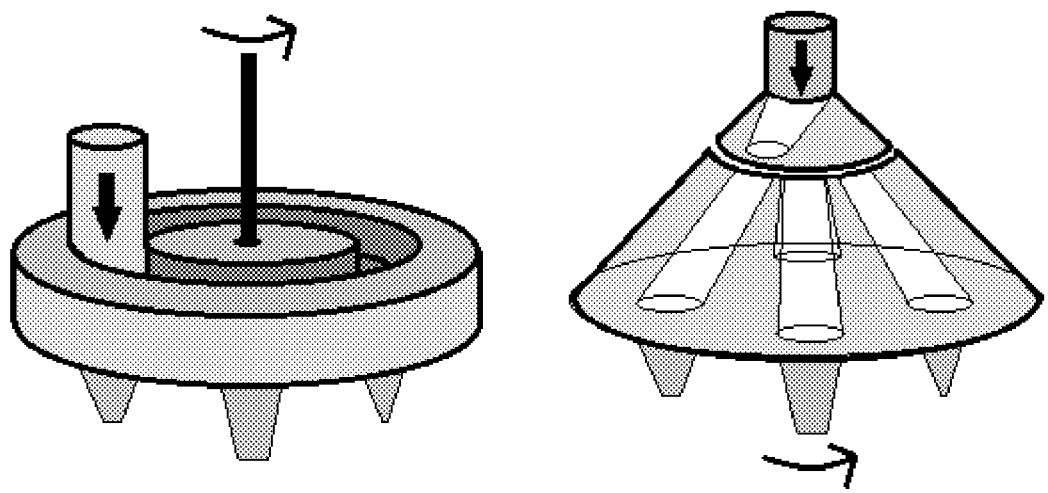
FIG. 33(a) and FIG. 33(b) are Examples of Rotating Interchangeable Nozzle 3D Printer extrusion heads

3D Printer nozzles could be designed so that two or more outlet nozzles of varying thickness or geometry could be toggled to provide increased variety of extrudate diameter and shape. In the examples described in FIGS. 33(a) and 33(b) the extrusion heads can be rotated so that one of four potential outlet nozzles can be utilized as an active nozzle. In this method, one could create a thicker or thinner extrudate.

Potential variations of this invention include any multi-nozzled extrusion heads containing two or more nozzles on the same head, servicing a single or multiple inlet streams. The head can use angular rotation as show in FIGS. 33(a) and 33(b), or the nozzles could be aligned in linear orientation with the head moving side to side to align the inlet over the desired outlet nozzle stream. The head could be re-positioned with a variety of different mechanisms. The head could be oriented by any dedicated internal motor, an external motor, manually, or any number of potential mechanical and/or electrical systems.

Potential benefits of this design could include increased control and variability of extrudate design. This could provide for thicker or thinner layers where desired potentially decreasing build time or providing increased strength or other material properties. The potential to extrude layers of different shapes with a single extrusion head greatly increases the different layering combinations that can achieved.

Dual Axis Filament Winder

Figure 34:
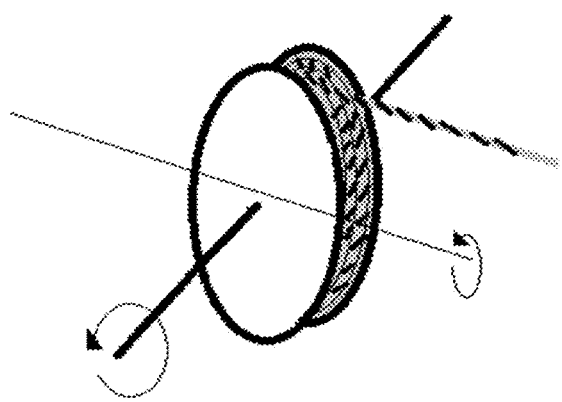
FIG. 34 is an example of a filament winder with two axes of rotation.

Spiral or 'candycane' designs such as the one seen in FIG. 10(a) could also be made with a side-by-side filament merger in conjunction with a filament winder which rotates along two separate axes (FIG. 34). One axis would act to wind the filament on a spool while the other axis would act to rotate the first axis and twist the filament to create the spiral design.

Magnetic Fields in Nozzle or Hot End

Another aspect of this invention pertains to the use of magnetic fields within and/or around a 3D printing nozzle or hot end. A magnetic field could be induced via a solenoid wrapped around the nozzle or hot end (including the entire traversal of the polymeric flow), wherein a current is passed through the solenoid material, creating a magnetic field, with a specific direction, that which the filament (extruded through the nozzle or hot end) passes through. There are a variety of other methods for creating a magnetic field though a nozzle or hot end, such as a system of magnets, a nozzle which is also a magnet or an external magnetic source, and these methods are considered to be within the scope of this invention.

The purpose for creating the magnetic field, through which the filament passes through, is that it could orient fibers, fillers, flakes, fibrils, crystals or other suspended particles within the plastic that demonstrate magnetic, paramagnetic or diamagnetic properties in a desired orientation. An example of this can be seen in FIG. 35, which shows a solenoid wrapped around a nozzle or hot end. As the magnetic, paramagnetic, or diamagnetic fibers or particles within the filament pass through the solenoid or magnet induced magnetic field, they reorient themselves in a specific direction relative to the magnetic field. In the instance of FIG. 35, the fibers in question demonstrate magnetic or diamagnetic properties, in that they are shown aligning directly with or against the magnetic field that they are shown passing through. Additionally or alternatively, magnetic particles inside the material could also help to enhance the alignment of other particles within the material and act to make the extruded material magnetic itself.

This could be applied to a wide variety of materials and chemicals. For example, nanocellulose crystals (particularly acetylated nanocellulose) could be mixed with PLA, then passed through a nozzle or hot end to be aligned in a consistent orientation. This could have profound effects on the material properties of the extruded material, including but not limited to, tensile strength, conductivity, brittleness, and a variety of other apparent material properties.

Beyond magnetizing the nozzle of a 3D printer, the nozzle or die of an extrusion head or even a filament fed device such as a side by side merger, wrapping merger or injection molding nozzle could also be magnetized or be made to be under the effects of a strong magnetic field by any of the methods mentioned above. This would allow for enhanced alignment of particles within an extrudate. Examples of such extrudates could include filaments, tubes, profiles or rods.

Software

The potential for software design with regards to detailed filament design is expansive. Software could be developed where the user could design the end product filament with regards to geometry, layer thickness, layer count, material composition, and/or layer orientation. The software could then instruct the user as to the proper sequence or orientation of filament heads so as to produce the desired result.

Software could also be designed so the user could model potential filament head pathways or layouts, and the software would return what the corresponding output filament would be. In this way, the user could model potential filament head positions and orientations and see a corresponding filament model without having to physically run the filament heads or 3D printer and expend material.

Software could be programmed with a feature that could also relay the potential material properties of the modeled output filament by layer. Such properties could include, but are not at all limited to, melting point data, tensile strength, solubility properties, malleability, composition, electrical conductivity, etc. It is also feasible that the program could be designed so the user could input the material properties, and the software could return a filament design that best fits the desired material properties.

Software could be programmed in order to control the rotation speeds of a dual axis filament winder. One axis would control the take up speed of a filament while the other axis would control the twist imparted on the filament. The rotation speed and direction of both of these axes could be programmed to vary over time based on a user's discretion. The rotation of the take up axis could be programmed to vary automatically based on spool geometry and filament diameter to prevent variations in take up speed as a result of the spool filling up. The program could also be made to couple with a tensioner or other measurement device to ensure the filament is being took up at the correct rate. Measurement devices could include a laser which could track the position of a hanging filament.

Software could also be designed to help accommodate and correct for naturally occurring variations and distortions caused by the extrudate's velocity profile. When a filament is processed, melted and printed by a 3D printer, a velocity profile forms where material moves very slowly by the walls of a printer nozzle and more quickly towards the center of the flow. Any features along the axis of an inputted filament will be distorted by this velocity profile during an extrusion process.

As an example, if there were a sudden change of color in a filament input, the color would change near the center of the flow much more quickly than the outside of the extrudate. To account for the distortion caused by a velocity profile it may be possible to print a filament with an inverse distortion such that extrudate will have the intended features. To predict what distortion would need to be printed within a filament, one may be able to couple all or a combination of internal geometrical characteristics of a nozzle, rates of extrusion, fluid dynamics equations, material rheology, heating profiles, empirical data and computational fluid dynamics to predict the relative residence time of different points and sections along the filament within the nozzle. It would be possible for a controller or software program which is accompanying or tied to the 3D printer to automatically calculate how the input or filament would need to be printed in order for the features to be extruded as intended or with reduced distortion. This approach could also be used in conjunction with a filament chop stacker.

Software could also be designed so as to automatically render and compute the necessary segmentation location and style, be it a taper, staircase or other method, of a printed part or filament involving an advancement stage. The software would be able to take a chosen gradient or pattern for the style of segmentation chosen. It could also accept different geometrical and material based sections, patterns or lengths that could be repeated or alternated between during the printing process. Software could be designed to also track the movement of various plates or platforms repositioning within a 3D printer which would be necessary for advancement. When printing the individual segments, the software could be made to recognize a calculated seam as a wall and produce any desired infill relative to the this new bounding wall. Infill examples include but are not limited to a lattice, grid or honeycomb structure. The program could be designed to account for any separations or gaps in the moving platforms detailed in earlier embodiments of this invention, FIG. 28 and FIG. 30.

Benefits of Multi and Microlayers.

Multilayers, microlayers and multicomponent geometries offer a very wide range of opportunities to enhance or achieve material properties. For example these layers can act to hide materials beneath the surface, 'mix' materials via high surface area contact, orient and align fibers due to shear stresses, change optical properties and even crystallize polymers as layer thicknesses decrease. These effects can act to enhance electrical conductivity, enhance anisotropic strength, as well as to promote or inhibit breathability. Encasing one material within another material could help to print materials which would otherwise not be suitable or be able to hold their shape. Creating many thin layers of materials could have a similar effect. Layering materials could also help bridge differences in melting temperatures. Multiple layers could help reduce agglomeration of fillers due to the internal shear stresses layers undergo during formation.

Products

An optical fiber or waveguide can be comprised of alternating layers of high and low refractive index materials around a core. Such profiles could be extruded with a 3D printer. These optical fibers could be printed onto a light-based circuit. A protective outer layer which may be more suitable to contact with the nozzle or environment could be incorporated. The individual layer thicknesses within the optical fiber would determine which wavelengths would be transmitted. Altering layers of differing refractive indices could also form an iridescent effect when printed.

Alternating layers comprised of separate parts of a two part epoxy or glue could be 3D printed. Small layer sizes could act to mix the materials. The layers or certain layers could contain fibers or fillers including but not limited to graphene, carbon fiber, fiber glass, wood fiber, nanocellulose fibers, or carbon nanotubes. The layers and extrusion process could act to align the fibers to create anisotropic strength. The 3D printer could then print in the orientation most needed by the structure. This would also be possible with a single part epoxy or glue.

Electrical connections could potentially be printed. Layers can act to align metal particles or conductive fillers in a manner to promote anisotropic conductivity. 3D printing conductive connections could have a wide range of applications including circuitry and shielding. The potential to embed materials within other materials could allow for highly conductive materials to be 3D printed which would otherwise be difficult to process. An extrudable metal could be used as a material to form conductive layers.

Such metals could also be used with compatible plastics to form insulated layers or pathways.

Enhancing or inhibiting breathability through crystallization effects of layered polymers could have applications in packaging or containers. The increased control of individual layer sizes versus the layer size of the nozzle could enhance these effects.

Extra small scale features could also be 3D printed using multi layers and multi component approaches. If one material was removable or soluble, its removal could leave features such as very small scale holes or pathways, see FIG.

36 (a and b) in which the gray area in FIG. 36(a) has been dissolved so as to produce FIG. 36(b).

Alternating materials could have applications in microchips, batteries and capacitors. Layers could include cathodes, anodes, separators, dielectrics, etc.

A threaded rod could be produced if the wrapping filament method was used around a core. If the wrapping filament had the right internal structures and could have excess filament removed, a thread could be deposited.

As with batteries, photovoltaic or solar cells rely on multilayered geometries for their function. Along with batteries, all, some or combination of these layers could be incorporated into a single filament. Such a filament could be created through extrusion, merging with other filament or it could be 3D printed. This filament, depending on its composition could be used to print a fully functioning battery or solar cell or it could be used to aid in the manufacturing process of printing such a device. Filament merging devices have the potential to produce these layers for a functioning product without the need for subsequent 3D printing.

Alternating layers could also be used to create with unique material properties. A brittle but strong material layered with a flexible material could create a strong yet flexible material. Flexible solar panels with enhanced photovoltaic properties can thus be attained. Photovoltaic threads that may be woven to produce solar garments is within the scope of the invention. Particularly preferred compounds used in the manufacture of these products include cadmium telluride (CdTe), copper indium gallium diselenide (CIGS), amorphous silicon, Gallium arsenide, Copper zinc tin sulfide, Perovskite and amorphous and other thin-film silicons (TF-Si).

Another property could include the ability to maintain strength at higher temperatures by layering a low melt temperature material with a high melt temperature material.

An environmentally friendly composite filament could be made with PLA and nanocellulose fibers (particularly acetylated nanocellulose). Nanocellulose fibers often form agglomerates which could be prevented or reduced through multiple layers.

Filaments with coiled or stacked internal fibers or wires could be used to print reinforced parts. For example, a continuous carbon fiber or fiberglass tow could be laid down with this filament allowing a printed part to have greatly enhanced mechanical properties. Another example would allow copper wire to be printed throughout a part, which could provide EMI shielding or a means for internal conductive circuits. If conductive fillers were present in the polymer surrounding the internal wire, links could be created between multiple layers of wires. Allowing connections to be created vertically through a printed part. Yet another example would allow for optical fibers to be printed throughout a part which would be useful for light based circuits or effects.

A 3D printed filament will have numerous potential applications. Such applications could include a battery filament. Current advances have allowed for a battery to be completely 3D printed by using various materials and filaments. However if this battery were printed in the form of a filament, there is potential that a printer could use this filament to print a part that part could essentially be a large battery. One could imagine a 3D printed smartphone case which could double as a battery for the phone itself.

The technology mentioned could also have a great impact in printing with biomaterials. The ability to create small features with different biomaterials will greatly enhance the degree at which a 3D printer could mimic bio structures found in nature or in humans. Different features or layers containing materials including but not limited to cells, proteins, lipids, pharmaceuticals or other materials with applications in medicine or biology could be created in a filament or stream of material that a 3D printer uses.

Simple household items, materials, or consumable goods could be printed from these filaments. Cellulose, or another similar material, could potential be used to give these items strength, as well as make them biodegradable and potential edible. For example, a potential filament could comprise two or more of the material layers necessary for making a product such as soap. This could greatly reduce the time and expense necessary to print such household items. Food products could also be layered in this fashion. Potentially, a preservative or layers of alternating flavor could be included in a final end product.

Alternating materials within the filament could have potential phosphorescent, fluorescent, or chemiluminescent properties. The chemically reactant layers could be separated by a thin layer of material, wherein upon interaction with an external stimuli (chemical, physical, mechanical, etc) the thin separation layer could break or dissolve allowing the chemically reactant layers to react emitting chemiluminescent light. Potential applications include a bulletproof vest including one of these chemiluminescent layers, where a bullet wound would illuminate the point of impact with light. An airplane or other transportation vehicle could be outfitted with a layer of this material which could illuminate when a stress fracture has occurred.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A meltable 3D printer product filament having a length, comprising:
   a section of a first solid 3D printer meltable filament which is aligned in-line or perpendicular to the length of the meltable 3D printer product filament and having a first chopped end including a first shape comprising at least one planar surface that is angled relative to the length of the meltable 3D printer product filament;
   a section of a second solid 3D printer meltable filament which is aligned in-line or perpendicular to the length of the meltable 3D printer product filament and having a second chopped end including a second shape comprising at least one planar surface that is angled relative to the length of the meltable 3D printer product filament;
   wherein the first chopped end of the section of the first solid 3D printer meltable filament and the second chopped end of the section of the second solid 3D printer meltable filament are stacked and welded together and the first shape of the first chopped end of the section of the first solid 3D printer meltable filament and the second shape of the second chopped end of the section of the second solid 3D printer meltable filament are complementary to one another and define a transition between the section of the first solid 3D printer meltable filament and the section of the second solid 3D printer meltable filament.

2. The meltable 3D printer product filament according to claim 1 further comprising additional sections of the first solid 3D printer meltable filament having a first chopped end and the second solid 3D printer meltable filament having a second chopped end that are aligned in-line or perpendicular to the length of the meltable 3D printer product filament to form a 1-5 mm thick filament.

3. The meltable 3D printer product filament according to claim 1 wherein said section of the first solid 3D printer meltable filament is aligned in-line to the length of the meltable 3D printer product filament to form a 1-5 mm thick filament.

4. The meltable 3D printer product filament according to claim 1 wherein said section of the second solid 3D printer meltable filament is aligned in-line to the length of the meltable 3D printer product filament.

5. The meltable 3D printer product filament according to claim 1 further comprising multiple sections of the first solid 3D printer meltable filament aligned in-line to the length of the meltable 3D printer product filament.

6. The meltable 3D printer product filament according to claim 1 further comprising multiple sections of the second solid 3D printer meltable filament aligned perpendicular to the length of the meltable 3D printer product filament.

* * * * *